(12) United States Patent
Srinivasan et al.

(10) Patent No.: US 12,524,628 B1
(45) Date of Patent: Jan. 13, 2026

(54) SYSTEMS AND METHODS FOR AUTOMATED ANALYSIS OF ONE OR MORE TABLES

(71) Applicant: Amazon Technologies, Inc., Seattle, WA (US)

(72) Inventors: Balasubramaniam Srinivasan, Santa Clara, CA (US); Zhengyuan Shen, Lynwood, WA (US); Jiani Zhang, San Jose, CA (US); Chuan Lei, Los Altos, CA (US); Xiao Qin, San Jose, CA (US); Xiaotong Li, Long Island City, NY (US); Dillon Ponzo, Little Silver, NJ (US); Eun Kyung Kwon, New York, NY (US); Phaneendra Maryala, Irvine, CA (US); Aleatha Parker-Wood, Palo Alto, CA (US); Huzefa Rangwala, District of Columbia, MD (US); Florian Tobias D. Saupe, Stuttgart (DE); Mark Horta, Nutley, NJ (US); George Steven McPherson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 130 days.

(21) Appl. No.: 18/519,373

(22) Filed: Nov. 27, 2023

(51) Int. Cl.
*G06F 40/40* (2020.01)
*G06F 16/2457* (2019.01)
*G06F 16/28* (2019.01)

(52) U.S. Cl.
CPC ........ *G06F 40/40* (2020.01); *G06F 16/24573* (2019.01); *G06F 16/285* (2019.01); *G06F 16/288* (2019.01)

(58) Field of Classification Search
CPC ... G06F 40/40; G06F 16/24573; G06F 16/285
See application file for complete search history.

(56) References Cited

U.S. PATENT DOCUMENTS

2011/0161081 A1* 6/2011 Ballinger .............. G10L 15/005
704/245

FOREIGN PATENT DOCUMENTS

WO   WO-2013192218 A2 * 12/2013 ........... G06F 16/387

\* cited by examiner

*Primary Examiner* — Ibrahim Siddo
(74) *Attorney, Agent, or Firm* — Eversheds Sutherland (US) LLP

(57) ABSTRACT

Systems and methods for automated analysis of one or more tables are provided. Particularly, a large language model is provided that analyzes a table (or multiple tables) and produces output information about the table without requiring the contents of the table to be provided as an input. For example, the large language model can output a natural language description of the table, description of the table contents, applications of the data in the table, privacy and security concerns, and/or any other types of relevant information. Additionally, a mechanism is provided that evaluates the outputs of the large language model for inaccurate or nonsensical natural language and provides an indication of the quality of the output to a user. The mechanism, for example, may include a combination of a hallucination filter and one or more metrics. The mechanism may also be used to filter the outputs of the large language model.

20 Claims, 17 Drawing Sheets

Table Description
This Comprehensive Dataset Provides a Wealth of Information about all Countries Worldwide, Covering a Wide Range of Indicators and Attributes. It Encompasses Demographic Statistics, Economic Indicators, Environmental Factors, Healthcare Metrics, Education Statistics, and Much More. With Every Country Represented, this Dataset Offers a Complete Global Perspective on Various Aspects of Nations, Enabling In-Depth Analyses and Cross-Country Comparisons.

Attribute Description
- Country: Name of the Country.
- Density (P/Km2): Population Density Measured in Persons Per Square Kilometer.
- Abbreviation: Abbreviation or Code Representing the Country.
- Agricultural Land (%): Percentage of Land area used for Agricultural Purposes.
- Land Area (km2): Total Land Area of the Country in Square Kilometers.
- Armed Forces Size: Size of the Armed Forces in the Country.
- Birth Rate: Number of Births Per 1,000 Population Per Year.
- Calling Code: International Calling Code for the Country.
- Capital/Major City: Name of the Capital or Major City.
- Co2 Emissions: Carbon Dioxide Emissions in Tons.

Inspiration

Potential Use Case
- Analyze Population Density and Land Area to Study Spatial Distribution Patterns.
- Investigate the Relationship Between Agricultural Land and Food Security....

Target Users
The Dataset Caters to Academics, Policy Makers, Economists, Environmentalists, Urban Planners, Business Analysts....

Privacy and Security
While the Dataset Offers Aggregated National Statistics, Concerns Include Potential Misrepresentation....

SYSTEMS AND METHODS FOR AUTOMATED ANALYSIS OF ONE OR MORE TABLES

BACKGROUND

Automatic summarization and analysis of databases adds immense value to data owners and users alike when dealing with company-scale data. However, tables from company databases usually contain little to no description of their constituent data or what they are used for. As a result, data stewards need to manually add descriptions to document and decorate the data assets after uploading, to aid downstream data discovery and analysis by other users. In addition, their workflow could be further complicated by the fact that table column names are hard to decipher for a non-expert who wishes to understand the data and create business usable descriptions. Moreover, column content may also not be available with restricted access to users across the organization.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

FIGS. 1A-1B depict an example use case for automated analysis of one or more tables in accordance with one or more example embodiments of the disclosure.

DETAILED DESCRIPTION

Figure 1A:
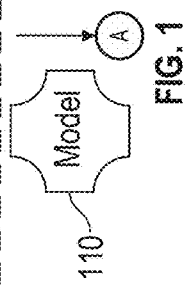

This disclosure relates to, among other things, systems and methods for automated analysis of one or more tables. The systems and methods provide for at least the generation of natural language outputs providing information about the contents of one or more data tables. Generation of this type of information is a challenging technical task because, without access to the table contents, language models often produce inaccurate and hallucinated results, which may often contain facts that are actually relevant to the table data. Additionally, the crucial post-processing step of identifying such inaccurate and/or hallucinated contents may be technically challenging. There exist no or limited methods to assess the quality of this type of output generation, which inhibits the improvement of the prompting techniques to create high-quality table summaries and other types of output information.

The systems and methods described herein provide a technical improvement over existing systems and methods by providing a large language model trained to generate concise, informative, and reliable summaries and highlights of information included within database tables. These summaries (and other information) may be generated by the large language model without requiring some or all of the data entries included within the table to be provided to the large language model (for example, the information included within the cells of the table). The large language model also includes self-verification functionality in the form of automatic hallucination mitigation and quality evaluation for the outputs generated by the large language model.

The system leverages the rich knowledge of large language models learned from pre-training or reinforcement learning with human feedback to generate table summaries, including column descriptions, table descriptions, target users, potential use cases for the data, potential security vulnerabilities such as personally identifiable information (PII), and other types of outputs. The system may leverage separate large language model prompts to generate outputs for each of the different types of outputs by using a sequential procedure. For instance, the column descriptions may be generated first by jointly passing the table information, such as the table name and schema (for example, list of column names and their data types, etc.) to the large language model. Metadata for the table may also optionally be provided. The obtained column descriptions may then be used in conjunction with the table schema and metadata (if provided) to obtain table descriptions.

The generated table descriptions may then be provided along with another prompt (and also the original input information) back to the large language model to produce the second output (for example, the column descriptions). This sequential approach provides a number of technical benefits, as is described further with respect to the flow diagram presented in FIG. 2. This approach also provides the technical benefit of addressing scenarios where the number of columns included in the table is greater than the maximum number of tokens in an output of the large language model, which allows for more effective batching.

The prompts for each stage may also be adaptively optimized to tables from different domains (for example, finance, medicine, etc.). Additionally, the descriptions for each section may be refined using the obtained information for subsequent sections. These iterations serve as a mechanism that provides technical benefits, such as reducing noise, improving coverage of necessary information, etc. in the descriptions as it converges.

As an example, a use case may exist where a system has a countable set of tables across different domains (e.g. finance, automotive, pharmaceuticals, etc.). In this use case, $T=\{t_1, t_2, \ldots, t_n\}\mathcal{T}=\{t_1, t_2, \ldots t_n\}T=\{t_1, t_2, \ldots, t_n\}$, where each table $t_i \in T$ and where $t_i=(n_i, m_i, \phi_i)$ has $n_i$a tuple of columns in the table, $m_i$ sampled rows (which the system may not have access to), as well as optional associated metadata (such as table names, attribute/column names, data types, as well as additional metadata associated with the dataset).

Here, the large language model may be leveraged to generate descriptions of the information in the table, as well as descriptions of every column, downstream use cases of the data in the table, etc. as well as confidence scores for all of these outputs.

$f_E;t_i \rightarrow$(col. descriptions, table descriptions, use cases of table, etc., scores), where $f_E$ is a large language model, trained with external knowledge, E, which implicitly serves as exogenous information to the table specific inputs while generating each of the above descriptions. The goal is to have table descriptions that serve as a sufficient indication of the table schema and the optional metadata and column content, while also being understandable by a human reader, concise, and not including any unwanted noise and/or incorrect information. Similarly, it is desired for column descriptions to be understandable by a human reader while also illustrating the importance of the column with respect to the overall table.

The large language model may be used in a variety of other use cases as well, and these use cases may extend beyond outputting information about the table or tables. As a first example, the large language model may be used to perform multi-table knowledge enhancement, in addition to providing information about a single table. That is, the large language model may receive multiple tables as inputs and may be able to not only provide outputs including information about the individual tables, but may also provide outputs including information about the relationship between the various tables. For example, a vehicle auction system may include multiple tables including information about various types of vehicles on which a user may bid. The different tables may be organized based on any number of criteria. The large language model may receive as inputs a first table including a first listing of vehicles and a second table including a second listing of vehicles. Based on an analysis of the two tables, the large language model may be able to determine relationships between the data entries in the tables. For example, the large language model may indicate that the two tables including vehicles for auction include vehicles produced by a certain manufacturer, etc. This information about the relationship between the data in the tables may also be output and presented to a user. This may provide a user with valuable insights about data stored across multiple tables without requiring the user to open both tables and review all of the data to identify potential relationships.

As a second related example, the large language model may be used to provide an enhanced search experience. For example, a user may provide a search query to a website, such as a search engine, a vehicle auction system, a media content system, or any other type of website or other type of system including search functionality. In some instances, the results of the search may be based on information included in one or more tables. For example, a vehicle auction system may include one or more tables of information relating to various vehicles on which a user may bid and/or other types of information. If the user inputs a search query to a vehicle auction system indicating a desire to view a particular make and model of vehicle, the large language model may be leveraged to identify the tables and/or portions of those tables that include information relevant to the search query. That is, not all of the tables may include relevant information to the search query and the large language model may be able to identify those tables that include the relevant information, such that a response to the search query may be determined and provided back to the user. The use of the large language model in this manner may not only serve to assist the system in determining which of the tables of access, but may also improve the efficiency of the system in filtering the amount of data that the system considers (that is, the system may not process the data entries in all of the tables).

Another related technical improvement is that the large language model may be able to identify relevant tables and data entries within those tables even if the column names, data entries, or other types of table contents are not readily ascertainable. For example, certain column names may include abbreviations or otherwise incomprehensible information that a user or even a system may not understand without the appropriate contextual information. However, the large language model may be able to determine that these column names are relevant to the user search request even if the column names do not exactly match the information in the query provided by the user. As one non-limiting example, if the user search query is for a turbocharged vehicle, the large language model may be able to ascertain that a column name in a table including "TT" may refer to a twin turbo vehicle that is relevant to the search query.

As a third related example, the large language model may be used to assist a chat bot provided on a website or other type of system. Similar to the search request use case, a user may interact with a web-based chat bot (or other type of chat bot) and may input a natural language query to the chat bot. A response to the input to the chat bot may require information from one or more tables associated with the website.

These are merely a few example applications of the outputs that may be produced by the large language model and the large language model may be used for a number of different purposes as well.

In some cases, a typical large language model has the potential to produce inaccurate or nonsensical outputs, however, large language models may still be preferable given their comprehensiveness and articulate language style. Therefore, the system also includes a self-verification mechanism such that the technical improvement of balancing the reliability of one or more large language model outputs, while maintaining the readability of the outputs (or when reliability is unable to be ensured, providing an indication of potential risks associated with seemingly accurate answers and associated data usage to users).

This self-verification mechanism may involve the use of a hallucination filter and a metric generation system. The hallucination filter serves to detect and eliminate potential hallucinated (for example, inaccurate, nonsensical, etc.) sentences or paragraphs by comparing an output of the large language model to the other stochastic outputs produced by the same large language model. The output of this filter may include one or more probabilities that portions or all of the output include a hallucination. The metric generation system considers a wide spectrum of supervised (when reference data is available) and unsupervised metrics. One or more scores may also be generated based on these metrics. The outputs of the hallucination filter and/or the metric generation system may be used to produce an indication of the accuracy of the output of the large language models to a user. Additionally, in some cases, the outputs of the large language model may be filtered based on the outputs of the hallucination filter and the metric generation system. For example, if a score produced based on the hallucination filter and the metric generation system fails to satisfy a threshold value, then that particular output may be filtered out and not provided to a user. Additional details about the hallucination filter are provided in at least FIGS. 3-5 and additional details about the metric generation system are provided in at least FIGS. 6-8.

While reference may be made herein to one large language model, this is not intended to be limiting, and any other number of large language models may similarly be used. Additionally, reference to large language models may also refer to a single large language model. Further, while reference is made herein to a large language model, any other type of machine learning model may also be applicable.

FIGS. 1A-1B depict an example use case 100 for automated analysis of one or more tables. Particularly, the use case 100 shows one example in which a single table 102 is provided as an input to a large language model 110 and the large language model 102 analyzes the table to produce one or more outputs, including a description of the table and its contents, among other types of information. However, this use case 100 is merely one example of a use of the large language model as described herein and is not intended to limit the scope of the large language model.

The use case 100 begins with the table 102 being provided to the large language model 110 as an input. However, not all of the information associated with the table may necessarily be provided to the large language model 110. In the use case 100, the information that is provided to the large language model 110 includes the name of the table 102 ("Global Country Information Dataset 2023") and names of columns included within the table 102 ("country," "density," "abbreviation," etc.). Additionally, metadata 108 may also be provided along with the table information. For example, the metadata 108 may include an indication of a dataset creator, an indication of a dataset source, etc. This metadata 108 is optional and may not be provided to the large language model 110 in some instances.

While some information about the table 102 is provided to the large language model 110, the data entries within the table (for example, the cell values in the table 102) may be unavailable and may not be provided to the large language model 110 along with the other input information. Alternatively, the data entries within the table 102 may be available and could potentially be provided to the large language model 110 but may not be required for the large language model 110 to perform the analysis and generate the outputs (proving for improved computational efficiency). In these instances, the data entries may intentionally not be provided to the large language model 110. This illustrates one of the technical improvements of the system including the large language model over existing systems as being able to produce table descriptions and other types of beneficial information without requiring all the data entries within the table to be received as an input by the large language model 110. However, in some cases, the data entries may be available and may be provided as further inputs to the large language model 110 as well.

The large language model 110 may be trained to analyze the input information and generate one or more outputs providing additional information about the table 102. For example, the use case 100 shows outputs 112 being produced by the large language model 110. In this specific example, the outputs 112 include a table-level description providing a summary of the contents of the table. The outputs 112 also include column-level descriptions (for instance, the column description for the "country" column indicates that the column includes the names of nations). The outputs 112 also include potential applications of the table data (for example, analyzing the effect of various factors on growth domestic product (GDP) or examining the relationship between agricultural land and carbon dioxide emissions). The outputs 112 also include indications of privacy and security considerations with the table 102, such as if the table 102 includes personally identifiable information, for example. The outputs 112 are merely exemplary and any other types of outputs may also be produced by the large language model 110. For example, as aforementioned, the results of the analysis performed by the large language model 110 may be used in a variety of other applications, such as providing a response to a search query, a question posed to a chat bot, etc.

The types of outputs that are produced by the large language model 110 may be determined in any suitable manner. That is, the large language model 110 may not necessarily produce the same types of outputs or number of outputs in each instance. In some instances, the types of outputs that are produced may be manually indicated by a user. For example, the user may manually indicate (through written text, a voice prompt, etc.) that the large language model 110 should produce outputs including a table description and column descriptions. As another example, the user may also select from a list of pre-defined types of outputs or may provide a custom request for a type of output that may not necessarily be predetermined. Additionally, in some instances, the types of outputs may be automatically determined by the system. The types of outputs may also depend on the contents of the input information, such as the type of information that is included within the table.

Figure 2:
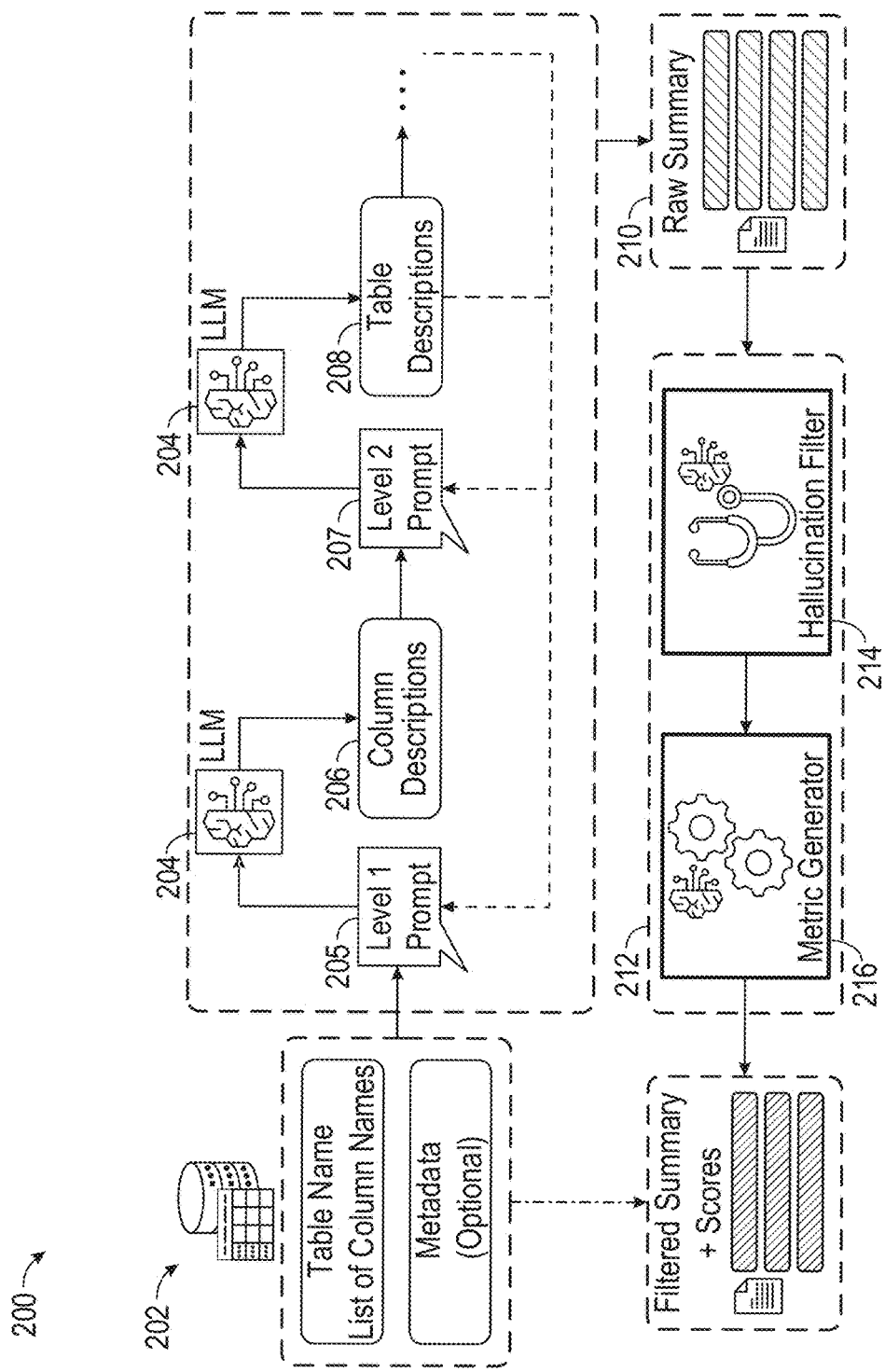
FIG. 2 depicts an example system architecture for automated analysis of one or more tables in accordance with one or more example embodiments of the disclosure.

FIG. 2 depicts a system architecture 200 for automated analysis of one or more tables. The system architecture 200 illustrates some of the elements associated with the generation of one or more outputs by the large language model, as well as the self-verification mechanism used by the large language model to evaluate the one or more outputs. For example, the system architecture 200 may include one or more inputs 202, one or more large language models 204 that produce one or more outputs 210 (the combination of the different outputs, such as first output 206 and second output 208 may be collectively referred to as outputs 210), and a verification system 212 including a hallucination filter 214 and a metric generator 216. As aforementioned, reference to a "large language model" may be used for consistency herein instead of one or more large language models, however, multiple large language models may also be used.

In some embodiments, the one or more inputs 202 may include some of the elements of one or more tables that are to be analyzed by the large language model. In some instances, the elements may include a subset of information associated with the one or more tables, such as table names, column names, and/or any other types of information that may be associated with the one or more tables. That is, the large language model 204 may be used to ascertain information about the one or more tables without requiring all of the information included within the tables or associated with the tables. For example, the large language model 204 may be able to determine information about the contents of the table (such as the entries associated with each of the columns of the table, etc.) without receiving the contents as an input.

In some instances, all information associated with the one or more tables may also be provided. For example, in addition to the column names, the table entries associated with each of the columns may also be provided. Any other types of information included within the tables or associated with the tables may also be provided as a part of the one or more inputs as well.

As aforementioned, the large language model 204 may be used to analyze either a single table or multiple different tables. Thus, the one or more inputs may include information associated with multiple tables in some instances. In such instances, additional information about the relationship between the tables may also be provided as an input. Additionally, in embodiments, the one or more inputs may also include metadata associated with the one or more tables. For example, the metadata may include an indication of a creator of the data, a data source, and/or any other types of metadata.

In embodiments, the large language model 204 may analyze the one or more inputs 202 to produce one or more outputs 210 (for example, outputs shown in the use case 100 and/or any other types of outputs described herein or otherwise). In embodiments, the outputs 206 produced by the large language model 204 may be produced sequentially based on different prompts provided to the large language model 204. As an example, information associated with a single table is provided as an input to the large language model 204, and the large language model 204 produces outputs 206 including a table description, table attribute descriptions, use cases for the information in the table, and privacy and security considerations for the table, and/or any other types of information.

As shown in FIG. 2, the large language model 204 may be provided a first prompt 205 that triggers the large language model 204 to produce the column descriptions. For example, the first prompt 205 may be an indication for the large language model 204 to produce column descriptions for the columns of the table that are included in the one or more inputs 202 provided to the large language model 204. The first prompt 205 may be automatically provided to the large language model 204 (or may also be manually provided by a user). For example, the first prompt 205 may be a text or voice input indicating for the large language model 204 to "generate column descriptions." However, this is merely exemplary and the first prompt (as well as any other prompt) may be provided in any other suitable form.

Once the first output 206 (for example, the column descriptions) is produced, this first output 206 may be provided as an input back to the large language model 204 along with a second prompt 207 indicating for the large language model 204 to produce a second output (FIG. 2 shows the second output 208 being a description of the table). The one or more inputs 202 may also be provided along with the first output 206 and the second prompt 207 to the large language model 204 to produce the table description. Operation 204 may iterate in this same manner to produce the remaining outputs (for example, the table attribute descriptions, use cases for the information in the table, privacy and security considerations for the table, etc.). In this manner, the large language model 204 may be provided with an increasing amount of input information when prompted to produce each of the different types of outputs.

Producing the outputs 210 in a sequential manner provides a technical benefit for the large language model of iterative refinement. That is, a subsequent output may be refined using the a prior output to provide more accurate subsequent outputs. This serves as a mechanism to reduce any noise, improve coverage of necessary information, etc. in the descriptions as it converges.

Producing the outputs 210 in this sequential manner is based on the chain-of-thought prompting style that boost the reasoning ability of the large language model by generating a series of intermediate reasoning steps. In this case, the whole summary of the table contents, D, may be equivalent to $D=D_T+D_C+D_I$, where t, c, and i represent table-level, column-level, and use case information. If the contents of the table are unavailable, the immediate input for the large language model may include column names and data types. Table metadata may also be accessible, however it is not guaranteed to be accessible. Therefore, a desirable order of modeling the probability distribution of individual components may be $P(D_C|C,m) \rightarrow P(D_T|D_C) \rightarrow P(D_I|D_C, D_T)$. Here, m represents the optional metadata.

As aforementioned, a technical improvement associated with this sequential prompting approach is that it addresses scenarios where a number of columns included in the table is greater than a maximum number of tokens in an output of the large language model, which allows for more effective batching.

Further, given the variability in table structures across different industrial sectors or verticals, it may be beneficial to refine the approach for generating table descriptions. This ensures both accuracy and relevance of the table description to the specific domain. To address this challenge, a two-step approach may be used. First, domain identification may be performed. Using the table information as input, the large language model 204 may be used to identify the pertinent domain of the table. This identification provides the context necessary to tailor subsequent operations. Next, domain-optimized prompts may be generated. Once the domain is identified, specialized prompts, which have been curated for each specific domain, are then used as the prompts provided to the large language model 204 to produce the various outputs 210. These prompts may be optimized to align with the nuances and terminologies of each domain, ensuring that the generated descriptions are both relevant and comprehensible.

While reference is made to the different outputs 210 being produced in sequential order, in other embodiments, some or all of the outputs 210 may also be produced in parallel as well. Continuing this same example, the one or more inputs 202 may be provided to the large language model 204 along with five different prompts to produce the table description, table attribute descriptions, use cases for the information in the table, and privacy and security considerations for the table in parallel. In further embodiments, some of the outputs 210 may be produced sequentially and some may be produced in parallel. This may be because the large language model 204 may benefit more from having additional information when producing some of the different types of outputs than other types of outputs. For example, the large language model 204 may benefit from having column description information when producing the table description, however, may not necessarily benefit as significantly when producing the privacy and security considerations. If this is the case, the privacy and security considerations may be produced in parallel with the column descriptions, but the table description may be produced sequentially after the column descriptions are produced. Any of the different outputs 210 may also be produced sequentially and/or in parallel in any other suitable order.

Figure 3:
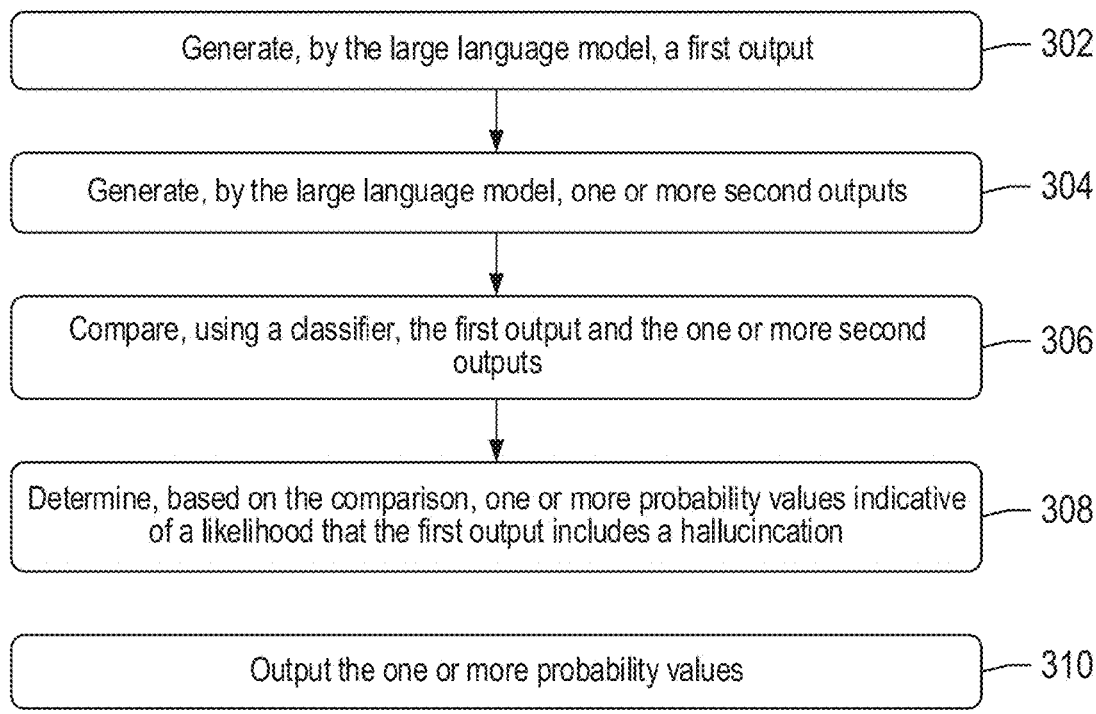
FIG. 3 depicts a flow diagram for hallucination filtering in accordance with one or more example embodiments of the disclosure.

Once the one or more outputs 210 are produced, the one or more outputs 210 may be provided to a verification system 212 to determine the accuracy of the one or more outputs. A first part of the verification system 212 may include a hallucination filter 214. FIGS. 3-5 depict flow diagrams 300-500 providing additional information about the hallucination filter 214.

Beginning with FIG. 3, the flow diagram 300 depicts high-level operations associated with hallucination filtering (for example, operations that may be performed by the hallucination filter 214). With respect to large language models (or other types of models), a "hallucination" may refer to a scenario where the model produces an output that is incorrect. For example, if the large language model may receive a prompt to analyze a table including information about animals at an animal shelter, but produces an output relating to vehicle sales, then this may be a hallucination. As another example, the model may simply produce output text that is nonsensical or does not form a comprehendible sentence.

In embodiments, the hallucination filter 214 may be a self-check operation performed by a large language model 204 itself. That is, the large language model 204 may itself implement the hallucination filter to determine the probability that hallucinated content was produced. The output produced by the large language model 204 may be based on a value (which may be referred to as a "temperature" value) that may be automatically set by the system or manually set by a user. For example, the temperature value may be a numerical value between 0 and 1 (or any other numerical range). The value may also be provided in any other form other than a numerical value as well (such as a string, etc.). If low, only have one possible answer. A larger value may result in the large language model 204 producing more randomized outputs. A smaller value may limit the large language model 204 to produce only one possible output. Leveraging this concept, the hallucination filter 214 may involve setting the value to a larger value such that the large language model 204 produces more randomized outputs (for example, FIG. 4 shows stochastic results 403-405 being produced, however, any other number of outputs may also be produced). The output produced by the large language model 204 may be compared to these different stochastic results to determine the likelihood of hallucinations existing in the output 210.

Turning to the operations of the flow diagram 300, operation 302 involves generating, by the large language model, a first output. For example, the output may include of the outputs described herein or otherwise as being produced by the large language model 204 when the large language model 204 analyzes input information (such as one or more inputs 202) associated with one or more tables (e.g., table description, column description, etc.). Operation 304 involves generating, by the large language model 204, one or more second outputs. As aforementioned, the temperature value of the large language model 204 may be set such that the large language model 204 produces different outputs with a certain degree of randomness. The one or more second outputs may serve as points of comparison for the first output produced by the large language model (for example, the stochastic results 403-405 and 503-505 for the examples shown in FIGS. 4-5).

Operation 306 involves comparing, using a classifier, the first output and the one or more second outputs. This comparison is based on the notion that when a large language model 204 hallucinates information, sampled responses to the same prompt may diverge and contradict each other. In contrast, for factual information, sampled responses will be more consistent. Thus, the self-verification mechanism involves generating multiple stochastic samples from the large language model 204 for a given prompt, and measuring consistency between the samples and main response using metrics such as BERTScore, question answering, n-gram language models, etc.

Operation 308 involves determining, based on the comparison, one or more probability values indicative of a likelihood that the first output includes a hallucination. Operation 310 involves outputting the one or more probability values.

In short, an example operation of the hallucination filter 214 for a text-based passage output by the large language model 204 (for example, a table description including a combination of multiple sentences) may be as follows. Generate, by the large language model 204, one main output as a text-based passage by setting the temperature value to 0.0. Generate 'N' number of stochastic outputs as passages by setting the temperature value to 1.0. Split the main output passage into individual sentences. Subsequently, loop through each sentence from the main output and each corresponding sentence in the stochastic results. Each pairing may be provided to a classifier to compute logits and then convert to probabilities. The probability for the contradiction may be used to compute the mean contradiction score across all stochastic samples, resulting in a single score for each sentence, indicating its consistency (or inconsistency) with the sampled passages in the stochastic results. The passage-level contradiction probability may be calculated by averaging over the sentence-level contradiction probabilities. This series of steps is merely intended to be illustrative and not limiting. FIGS. 4-5 provide illustrative examples of these operations associated with the hallucination filter.

Figure 4A:
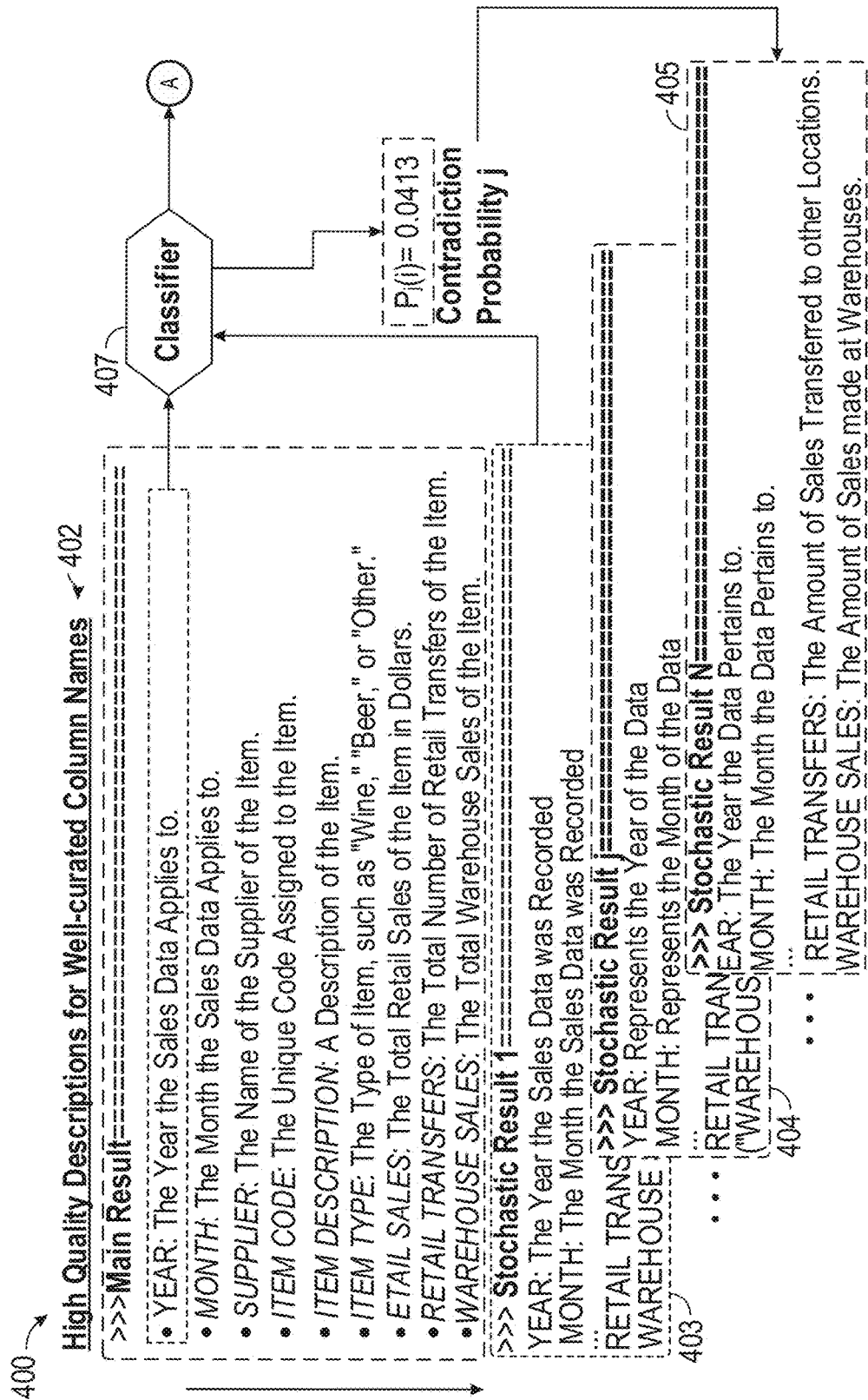
FIGS. 4A-4B depict an example flow diagram for a hallucination filter in accordance with one or more example embodiments of the disclosure.
Figure 4B:
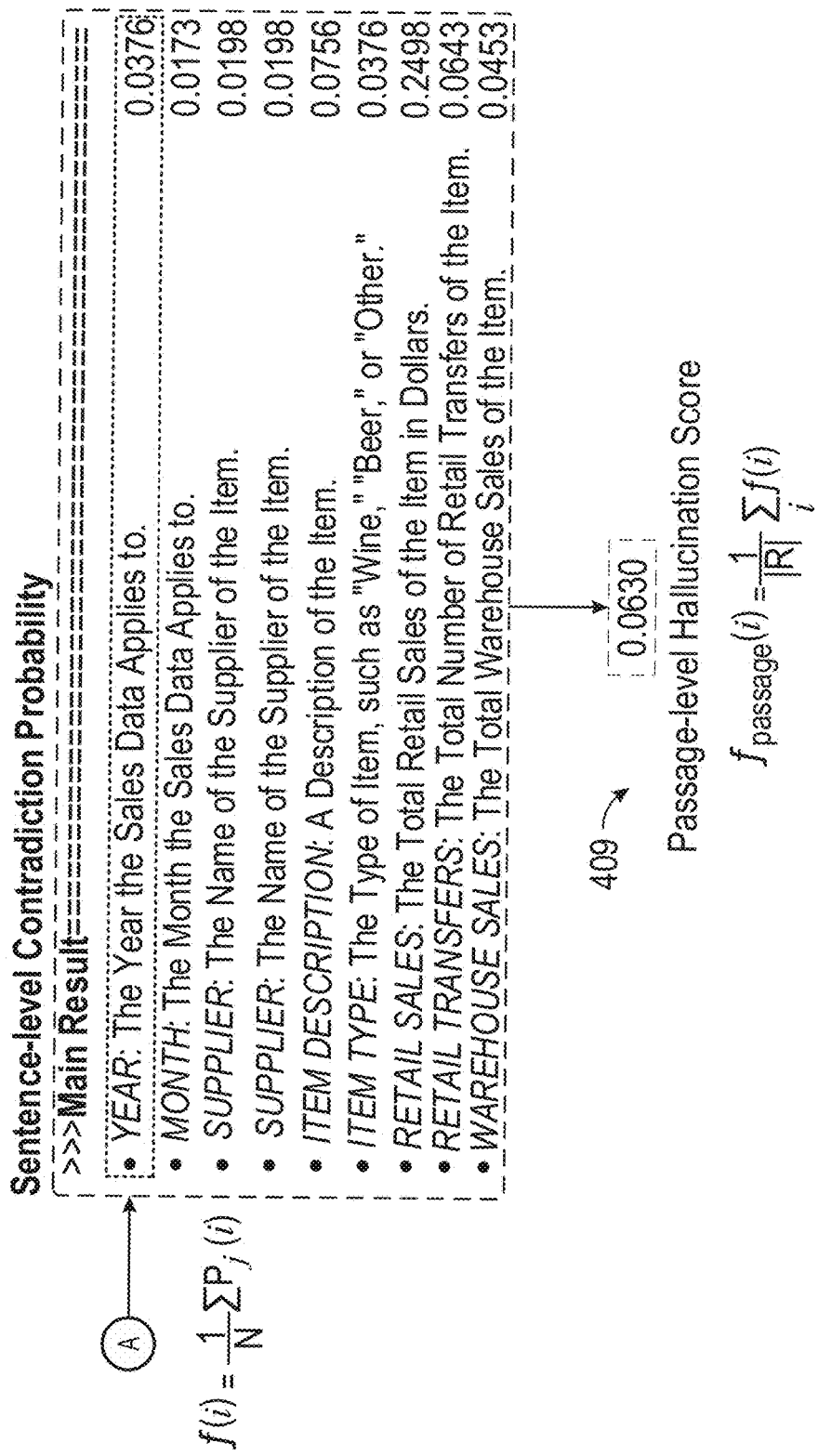

Turning to FIGS. 4A-4B, the flow diagram 400 shows a first illustrative example of hallucination filtering. The flow diagram 400 begins with an output 402 of a large language model (which may be large language model 204 or any other large language model described herein or otherwise) being provided as an input to a classifier 407 (such as a BERT-based classifier or any other type of classifier). This output 402 is provided along with several additional stochastic results (for example, stochastic results 403-405) for the same type of output (for example, the column descriptions). That is, the temperature value of the large language model may be set such that the large language model produces multiple additional outputs (in the form of the stochastic results 403-405) with some variation.

The classifier may perform a comparison between portions of the output 402 and corresponding portions of the stochastic results 403-405. For example, FIGS. 4A-4B show that individual sentences or column descriptions are compared. These comparisons may be performed to determine any differences between the portions of the output 402 and the stochastic results 403-405. However, any other combinations of different portions of the output (or the entirety of the output) may also be compared between the output 402 and the stochastic results 403-405 as well. For example, multiple sentences may be compared at a time, an entire passage (e.g., the entirety of the table description, etc.) may be compared, etc.

In embodiments, the classifier may produce various probability values for each compared portions of the output 402. The probabilities may represent a likelihood that the particular portion of the output 402 includes a hallucination and may be based on the comparison between the output 402 and the stochastic results 403-405. For example, FIGS. 4A-4B show various probabilities that are determined for each of the different column descriptions produced by the large language model as output 402. A probability value of 0.0376 is produced for the "year" column description. A probability value of 0.0173 is produced for the "month" column description. The larger value associated with the year column description relative to the month column description may indicate that the year column description has a higher probability of being a hallucination produced by the large language model than the month column description. This may be based on a determination by the classifier that there were greater inconsistencies between the year column description in the output 302 and the year column descriptions in the stochastic results 403-405. However, the larger probability value providing a greater indication of a hallucination is merely exemplary and a greater indication of a hallucination may be indication in any other manner (for example, smaller numerical values, strings, Booleans, etc.).

Finally, these individual probabilities may then be normalized to calculate overall sentence and/or passage-level hallucination scores. In embodiments, one result of the hallucination filter may be an overall confidence score 409. For example, FIGS. 4A-4B show an overall confidence score 409 of 0.0630. This score may provide an overall indication of the likelihood that hallucinations exist in the output 402 produced by the large language model based on some or all of the individual probabilities associated with the different column descriptions in the output 402.

In embodiments, a threshold may be set to filter out sentences or paragraphs with low confidence, or equivalently, high hallucination probability. For example, if a particular sentence (or other portion of the output 402) fails to satisfy the threshold, the sentence (or other portion of the output 402) may not be provided as an output of the large language model. As another example, even if a single sentence (or other portion of the output 402) fails to satisfy the threshold, then the entirety of the output may still be produces. However, if a given number of sentences (or other portion of the output 402) fail to satisfy the threshold, then the entirety of the output may be filtered out and not provided. The filtering may also be performed in any other suitable manner. "Failing to satisfy" the threshold may refer to the output being less than the threshold, less than or equal to the threshold, greater than the threshold, and/or greater than or equal to the threshold depending on the threshold and values that are used in a particular instance. The same may apply to "satisfying" the threshold.

Due to the rich contextual information available from the well-curated table schema, the generated attribute-level descriptions are also of high quality. Moreover, the results from the stochastic generation are also consistent (hard to generate contradictory descriptions), leading to overall low sentence-level hallucination scores.

Figure 5A:
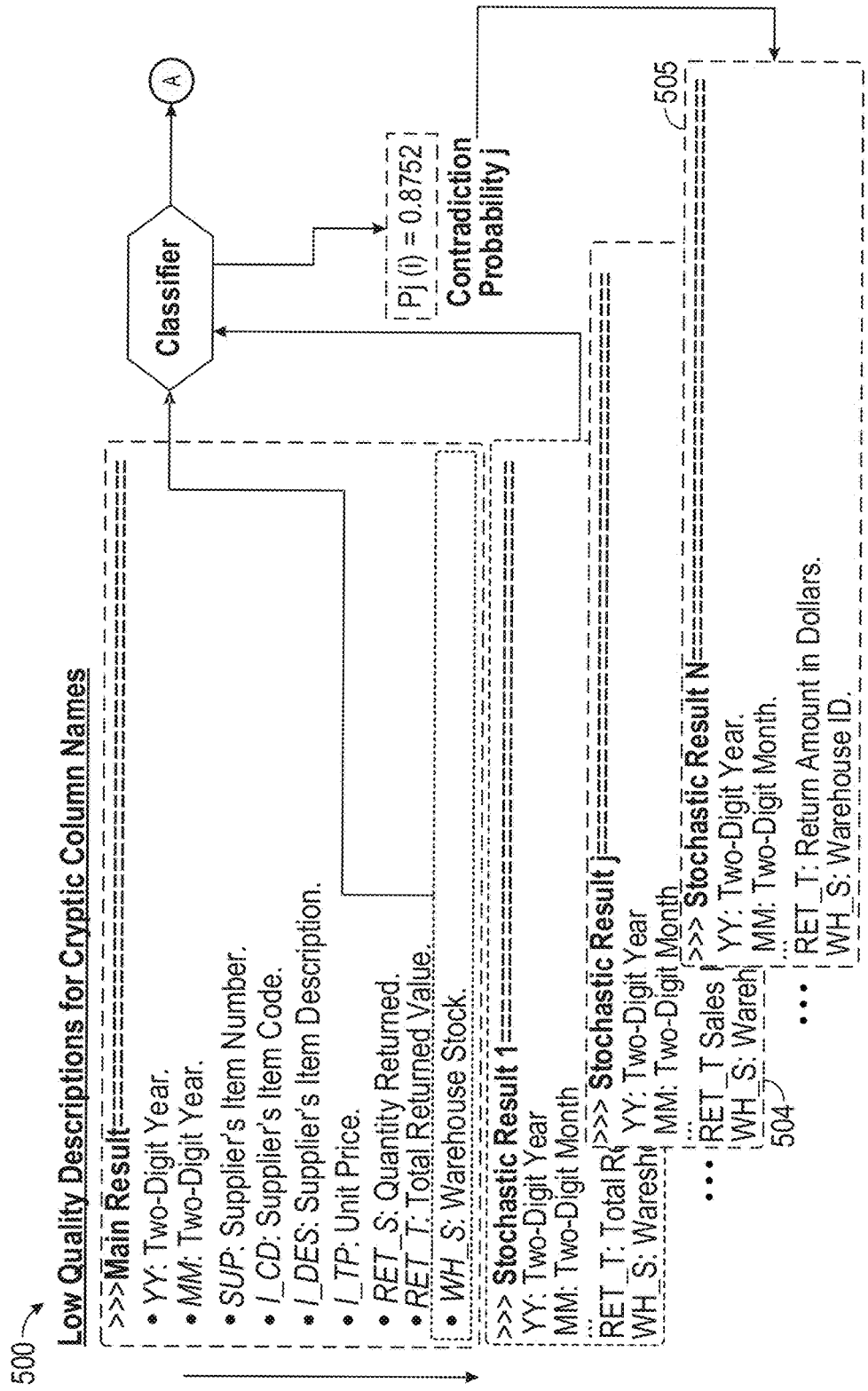
FIGS. 5A-5B depict another example flow diagram for a hallucination filter in accordance with one or more example embodiments of the disclosure.
Figure 5B:
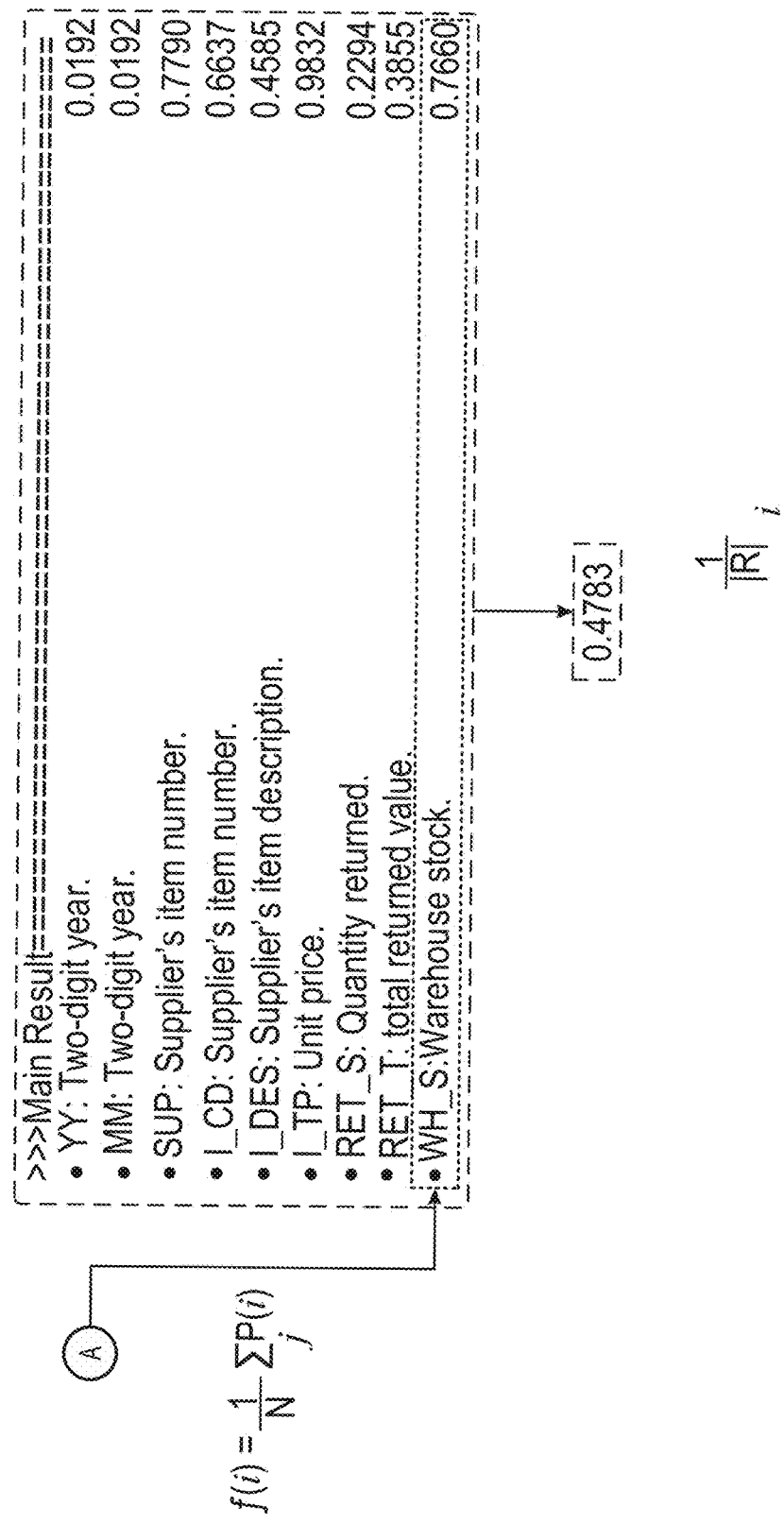

The flow diagram 500 of FIGS. 5A-5B shows a second illustrative example of hallucination filtering. In contrast with the first example shown in FIGS. 4A-4B, some ambiguity is intentionally introduced in the flow diagram 500 by providing table schema with abbreviated column names.

In this case, the column descriptions are generated from a more cryptic and ambiguous schema that may be more prone to hallucinations. In this case, the stochastic generation diverges more significantly, resulting in higher hallucination scores. The descriptions for some of the columns, however, provide exceptions with hallucination scores as low as 0.0199 and 0.0192, mainly because these are common abbreviations.

Figure 6:
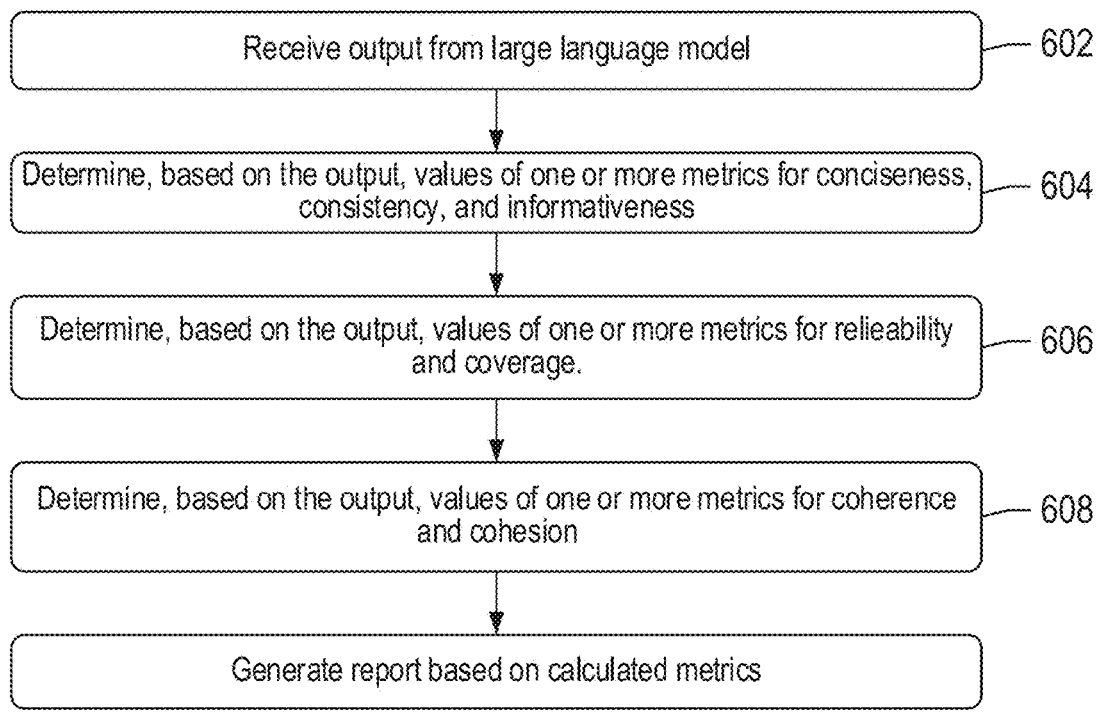
FIG. 6 depicts a flow diagram for metric generation in accordance with one or more example embodiments of the disclosure.

FIG. 6 depicts a flow diagram 600 for metric generation in accordance with one or more example embodiments of the disclosure. As aforementioned, metric generation is one of the functions of the evaluation system that evaluates the outputs produced by the large language model. The output of the metric generation may be used individually or in combination with the output of the hallucination filter to produce an evaluation of the outputs of the large language model. The process of obtaining annotations, rankings, and scores from human annotators for thousands (or more) of tables cannot be performed manually. Therefore, the automated calculation of the metrics as described herein serves as proxy functions that can provide such an evaluation mechanism.

A number of different metrics may be analyzed. In embodiments, 13 different metrics from three different categories (for example, metrics for conciseness and informativeness, metrics for reliability and coverage, and metrics for coherence and cohesion) may be analyzed, however, this is not intended to be limiting. The metrics may include a mix of supervised and unsupervised metrics. The goal of the metrics is to serve as unbiased proxy functions. While reference is made to a particular number of metrics and particular types of metrics, these metrics are merely exemplary and any other metrics and number of metrics may also be used.

Turning to the operations of the flow diagram 600, Operation 602 involves receiving an output from the large language model. This output may be any of the different types of outputs described herein or otherwise (e.g., table descriptions, column descriptions, use cases for the data, privacy and security considerations, etc.). Operations 604-608 involve determining values associated with one or more metrics based on the output received from the large language model. Particularly, operation 604 involves determining values of one or more metrics for conciseness, consistency, and informativeness. Operation 606 involves determining values of one or more metrics for reliability and coverage. Operation 608 involves determining values of one or more metrics for coherence and cohesion.

Beginning with operation 604, with respect to metrics for conciseness and informativeness, conciseness may generally refer to using the fewest words possible to convey an idea clearly. Informativeness may generally refer to non-redundant, non-meaningless, and non-general content, and the generated output is significantly sufficient in diversity and specificity. The conciseness metrics may include an approximation of Kolomogorov Complexity and an approximation of minimum description length via embedded variance, for example. The metrics for informativeness may include semantic entropy and KL divergence, for example.

Beginning with metrics for conciseness (specifically approximation of Kolomogorov Complexity), the Kolmogorov complexity, $K(x)$, of a string, $x$, is the length of the shortest possible description of $x$ in some fixed universal description language. This is utilized as a measure of the computational resources needed to specify a string. However, true Kolmogorov complexity may be non-computable, so it may not necessarily be computed directly. Here, it may be approximated using compression algorithms. The length of the compressed version of a string is a proxy for its Kolmogorov complexity. Embeddings may be compressed for a given text and the size of the compressed representation may be measured. In some instances, a heuristic may be leveraged to approximate the Kolmogorov complexity using embeddings and compression. The size (in bytes, for example) of the compressed embeddings is returned as a heuristic for the Kolmogorov complexity of the text.

Turning to the approximation of minimum description length via embedding variance, the minimum description length (MDL) relates to the effective compression of a set of data. If a piece of text is regarded as "data," the MDL may be interpreted as the smallest length (in terms of some encoding) at which this data can be represented without loss of any information.

Since, MDL for text may be difficult to directly compute, embedding variance over the descriptions generated by the large language model may be used. This measures the variance of the embeddings for words in the table descriptions. If a piece of generated description is concise and information-dense, the word embeddings may have higher variance (spreading across various topics or semantics). In contrast, repetitive or verbose descriptions may have embeddings that are clustered closely together, leading to lower variance.

Turning to the metrics for informativeness (specifically semantic entropy), semantic entropy of the generated text to track diverse information contained in the text generated by the large language model (semantic entropy rather than simple token-based entropy over token frequency may reduce unwanted entropy due to different but synonymous words). The steps of this process may include the following: (1) tokenize and encode the text as embeddings, (2) cluster similar words (introduce a threshold for the same), (3) compute entropy as $-\Sigma_i p(x_i)\log_2 p(x_i)$, and (4) compare entropy between different sources. A higher entropy potentially may indicate richer information.

Turning to KL divergence, KL divergence measures the difference between two probability distributions. This can be useful to compare the information content of two different pieces of text or to compare a text's distribution to a reference distribution. In this instance, the two distributions may be the generated text, P, and the reference text, Q. The steps of the process may include: (1) tokenize the texts and obtain embeddings for each sentence in the texts, (2) use k-means clustering (or any other type of clustering on the embeddings to obtain a summarized representation of the text in terms of key "semantic" clusters (clusters may be created over sentences in both the texts)), (3) construct a probability distribution based on cluster frequencies (e.g., for each piece of text, see how many sentences go to each of the above clusters), and (4) Compute KL divergence as $-\Sigma_i p(x_i)\log_2 p(x_i)/q(x_i)$.

Turning to operation 606, with respect to reliability and coverage, reliability may generally refer to precision and accuracy of an output. Precision may generally refer to a measure of the quality of semantic overlap in each sentence between generated and reference texts. Coverage may generally refer to the extent to which the output captures all of the metadata and/or interactions across data in the table. The reliability and coverage metrics may include semantic overlap and overlap in question answering. In some embodiments, these metrics may be supervised metrics.

Figure 7A:
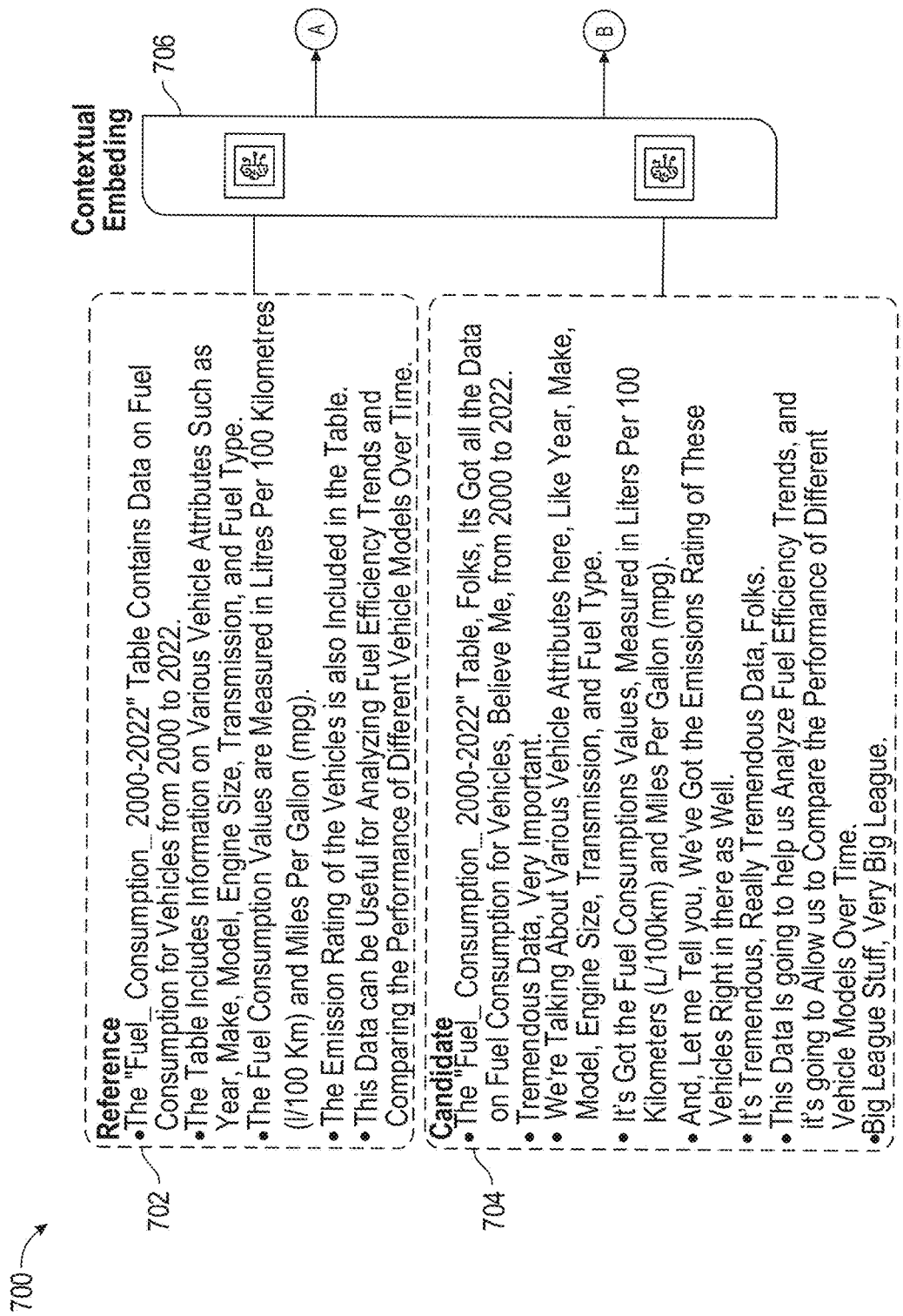
FIGS. 7A-7B depict a flow diagram for predicting semantic overlap in accordance with one or more example embodiments of the disclosure.
Figure 7B:
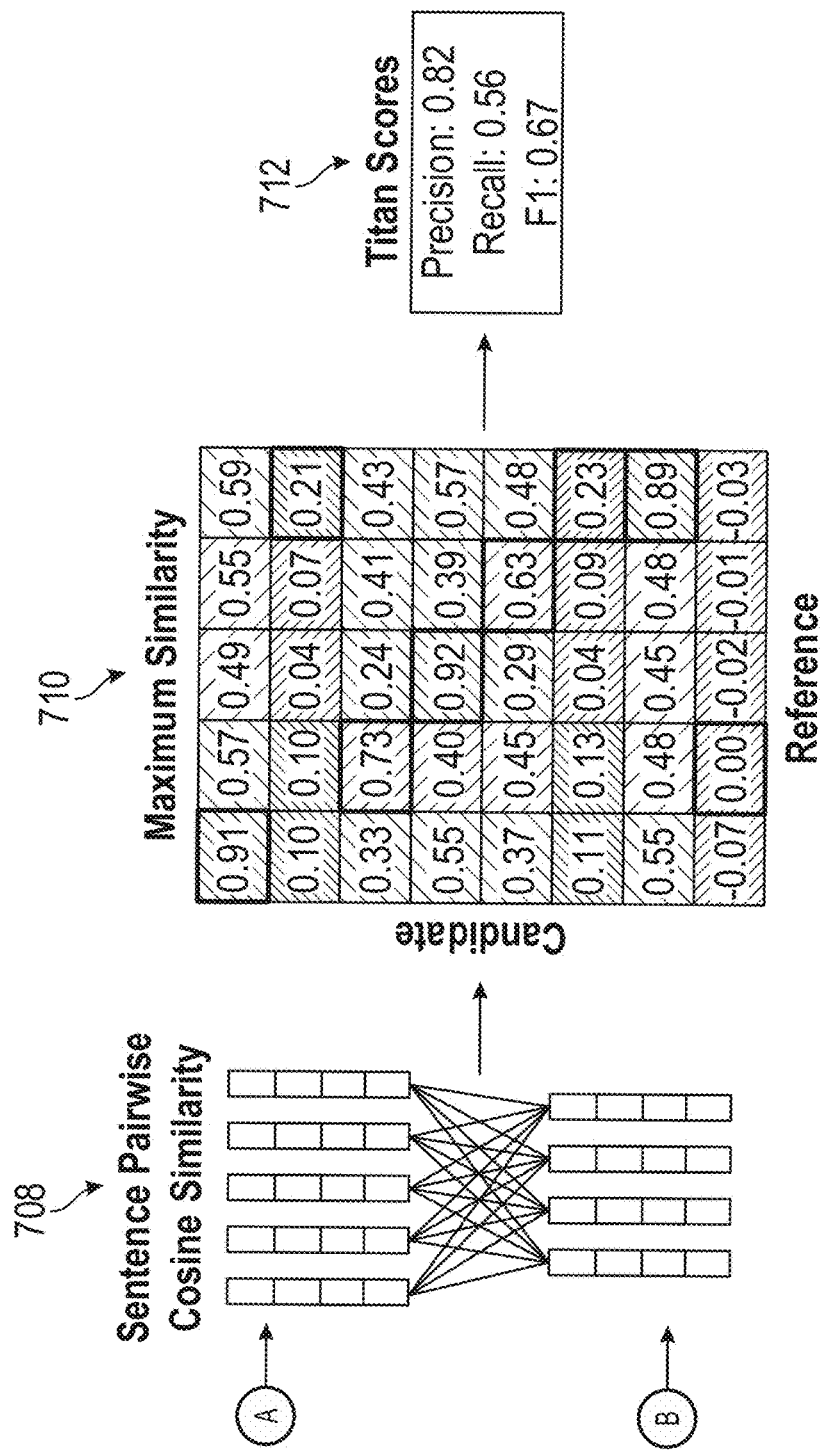

FIGS. 7A-7B depict a flow diagram 700 for determining semantic overlap. To better capture the semantics and therefore estimate the semantic overlaps between a reference output 702 from a large language model and a candidate output 704 (for example, the main output that is being evaluated based on the metrics) from the large language model, large embedding models may be used to generate embeddings 706 from the outputs of the large language model. These embeddings 706 may be sentence-level embeddings, for example. A similarity score between each sentence in the candidate paragraph and each sentence in the reference paragraph may be computed. Unlike existing sentence-level metrics for evaluation, such as BertScore and BartScore, which place more emphasis on token-wise embedding similarity, here the similarity may be computed at the sentence-level. Additionally, a more effective and larger embedding model is leveraged and the semantic overlaps between the long summary candidates may be better captured. This is especially beneficial for the table-level summary and inspiration outputs, since these summaries are typically long and narrative, and the order of the sentences may be arbitrary.

At operation 708, pairwise cosine similarity scores are first computed for all the sentences in prediction and the ground truth reference, to form a matrix containing pairwise similarity (indicated by the heat map in FIG. 7B).

At operation 710 max values over the reference dimension are averaged to computed the semantic overlap recall, similarly the max values over the candidate dimension are averaged to calculate the precision. The F1 is the harmonic mean of the precision and recall.

The output (as shown at operation 712) of the semantic overlap determination may be one or more scores, which may be numerical values, for example. In embodiments, the scores may include a precision score, a recall score, and an F1 score. The precision score may be computed from sentence pairwise cosine similarities as $P_{SemOv} = \Sigma_{x_j \in x} \max_{\hat{x}_j \in \hat{x}} x_i^T \hat{x}_j / |x|$. The recall score may be computed from sentence pairwise cosine similarities as $R_{SemOv} = \epsilon_{x_j \in x} \max_{\hat{x}_j \in \hat{x}} x_i^T \hat{x}_j / |x|$. The F1 score may be computed as $2*(P_{SemOv}*R_{SemOv})/(P_{SemOv}+R_{Semov})$.

Figure 8A:
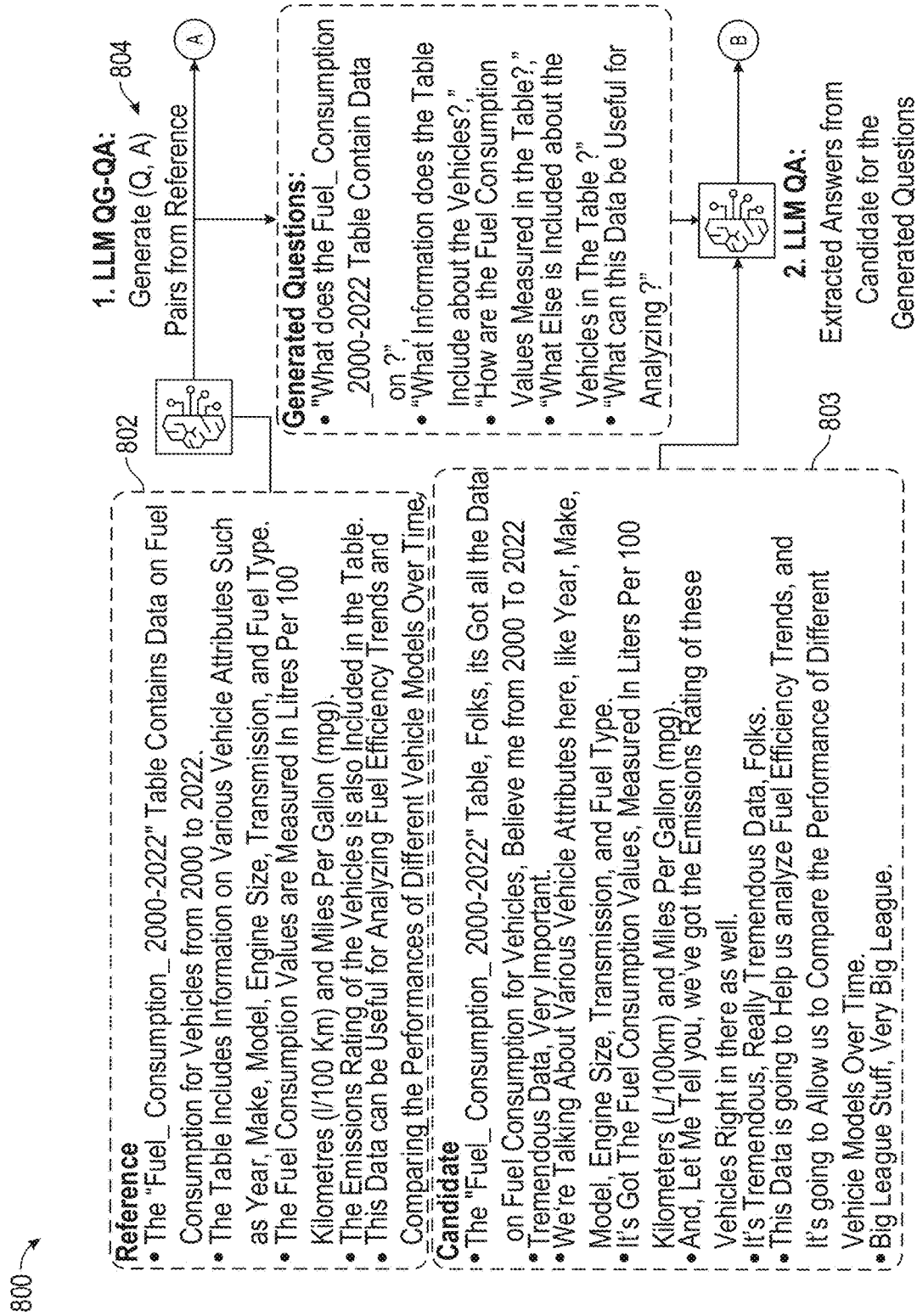
FIGS. 8A-8B depict a flow diagram for question-answering overlap in accordance with one or more example embodiments of the disclosure.
Figure 8B:
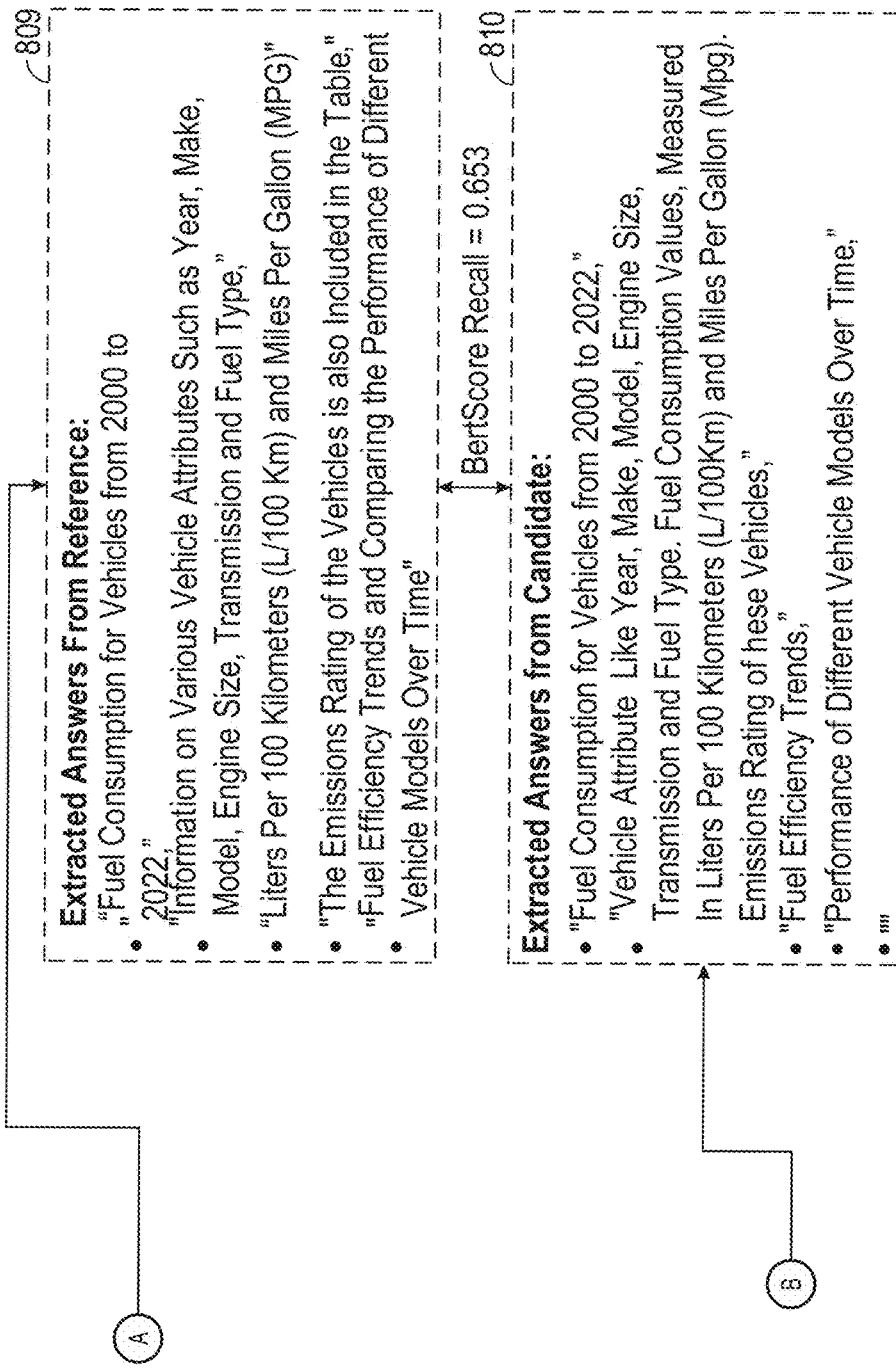

Turning to overlap in question answering, FIGS. 8A-8B depict a flow diagram 800 for predicting overlap in question answering. Predicting overlap in question answering is a method to measure the coverage of key concepts in the reference summary using a generated candidate summary 803. Intuitively, a set of question and answer pairs could be extracted from the reference summary 802. For an ideal candidate summary 803, all of the questions should be able to be answered against the reference summary 802 correctly. Therefore, the following steps may be performed for the question answer for the candidate summary 803. First, at operation 804, the large language model may be used to extract answer spans from the reference summary 802 and form questions regarding the answers. Second, the candidate summary 803 may be used as an input for the large language model to extract answers for those questions generated in operation 804. The large language model may then produce an empty answer if an answer cannot be extracted from the prediction candidate. Finally, at operation 808, the average BertScore recall values (or other similar types of values) may be calculated as a measure for question answer coverage, between the answers for the same set of questions from the reference 809 and the candidate 810.

Turning to the metrics for cohesion, the lexical cohesion score is a score which is reliant on identifying the recurrence of lexical items, such as using pronouns to refer back to nouns, or the repetition of certain words and phrases which helps in linking different parts of a text. Here this score is simply computed by the ratio of repeated words to the total number of words.

The perplexity computed from a pre-trained autoregressive model may gauge how well the probability distribution predicted by the model aligns with the actual distribution of the words in the text.

To learn the proxy function that integrates all the 13 submetrics scores, human annotations are performed, where annotators are given the same inputs (table name, schema, and optional metadata) and the candidate summaries generated from a series of LLMs and asked to rank the candidates, as well as providing their own refined summaries.

Figure 9:
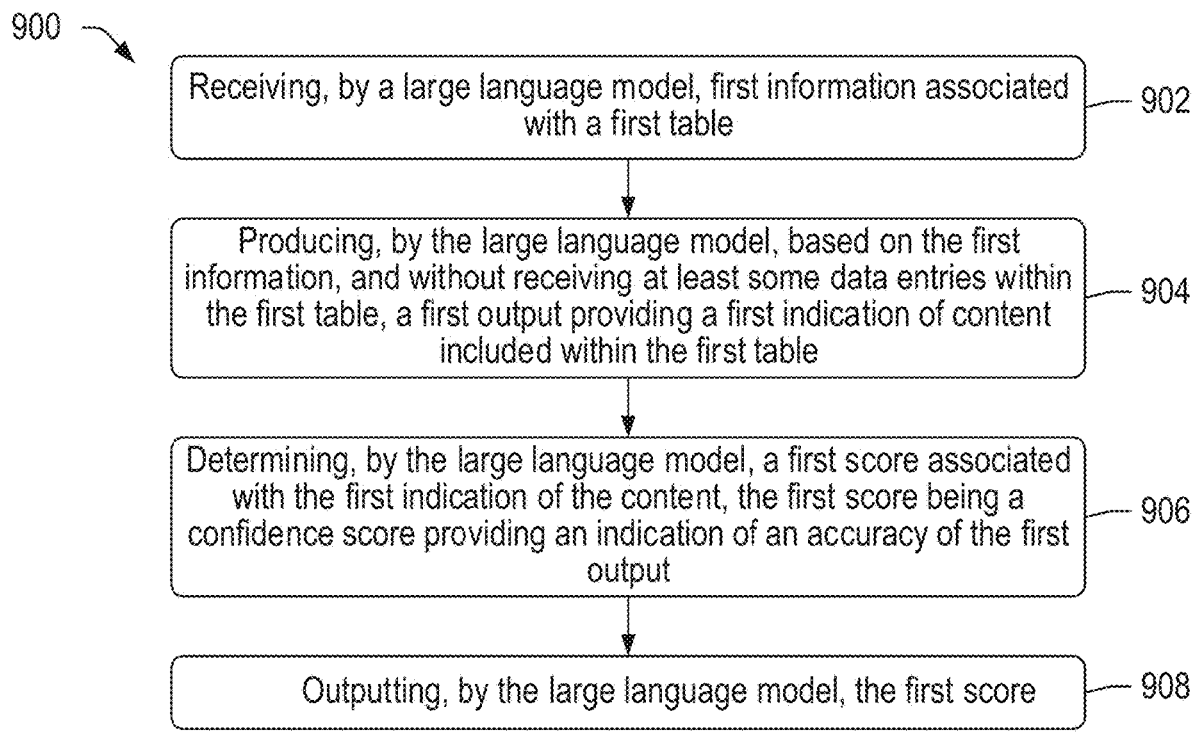
FIG. 9 depicts a method for automated analysis of one or more tables in accordance with one or more example embodiments of the disclosure.

FIG. 9 depicts an example method 900 for automated analysis of one or more tables. Some or all of the blocks of the process flows or methods in this disclosure may be performed in a distributed manner across any number of devices or systems (for example, user device 401, computing device 404, computing device 1200, etc.). The operations of the method 900 may be optional and may be performed in a different order.

At block 902 of the method 900, computer-executable instructions stored on a memory of a system or device, such as, user device 401, computing device 404, computing device 1200, etc., may be executed to receive, by a large language model, first information associated with a first table. The first information may include any of the input information described herein as being provided to a large language model (or any other information). For example, the first information may include a table name, column names, metadata, etc.

While some information about the table is provided to the large language model 110, the data entries within the table (for example, the cell values in the table) may be unavailable and may not be provided to the large language model along with the other input information. Alternatively, the data entries within the table may be available and could potentially be provided to the large language model but may not be required for the large language model to perform the analysis and generate the outputs (proving for improved computational efficiency).

Further, as aforementioned, the large language model may also be used to analyze multiple tables as well. Thus, the large language model may receive input information associated with more than one table.

At block 904 of the method 900, computer-executable instructions stored on a memory of a system or device may be executed to produce, by the large language model, based on the first information, and without receiving at least some data entries within the first table, a first output providing a first indication of content included within the first table.

The first output may include any of the outputs described herein as being produced by a large language model (or any other types of outputs). For example, the first output may include a table-level description providing a summary of the contents of the table, column-level descriptions, potential applications of the table data, indications of privacy and security considerations with the table, etc. In some instances, the outputs may also be used for other purposes, such as for use to provide search results in response to a user search query, providing an answer to a question posed in a chat bot associated with a website, and/or any other applications described herein or otherwise. At block 906 of the method 900, computer-executable instructions stored on a memory of a system or device may be executed to determine, by the large language model, a first score associated with the first indication of the content, the first score being a confidence score providing an indication of an accuracy of the first output. At block 908 of the method 900, computer-executable instructions stored on a memory of a system or device may be executed to output, by the large language model, the first score.

In embodiments, the first information includes at least a table name, a column name, a data type, and a data type. In embodiments, the first indication of content included within the first table includes at least one of: a table description, an attribute description, and a use case for data included within the first table.

In embodiments, determining the confidence score may also include producing, by the large language model, a second output providing a second indication of content included within the first table, comparing, using a classifier, the first output and the second output, determining a difference between the first output and the second output based on the comparison, and determining, based on the difference, a probability that the first output is a hallucination produced by the large language model.

In embodiments, the method 900 may also include determining one or more metrics associated with the first output and determining, by the large language model and based on the one or more metrics, a second score, wherein the first score is based on a combination of the probability and the second score. The method 900 may also include filtering the first output based on at least one of the probability and the second score.

In embodiments, the method 900 may also include receiving, by the large language model, a first prompt, wherein the first output is produced based on the first prompt and receiving, by the large language model, a second prompt and the first output, wherein a second output is produced by the large language model based on the first prompt and the first output.

In embodiments, the method 900 may also include receiving, by the large language model, second information associated with a second table and determining, by the large language model and based on the first information and second information, a relationship between the first table and the second table.

Figure 10:
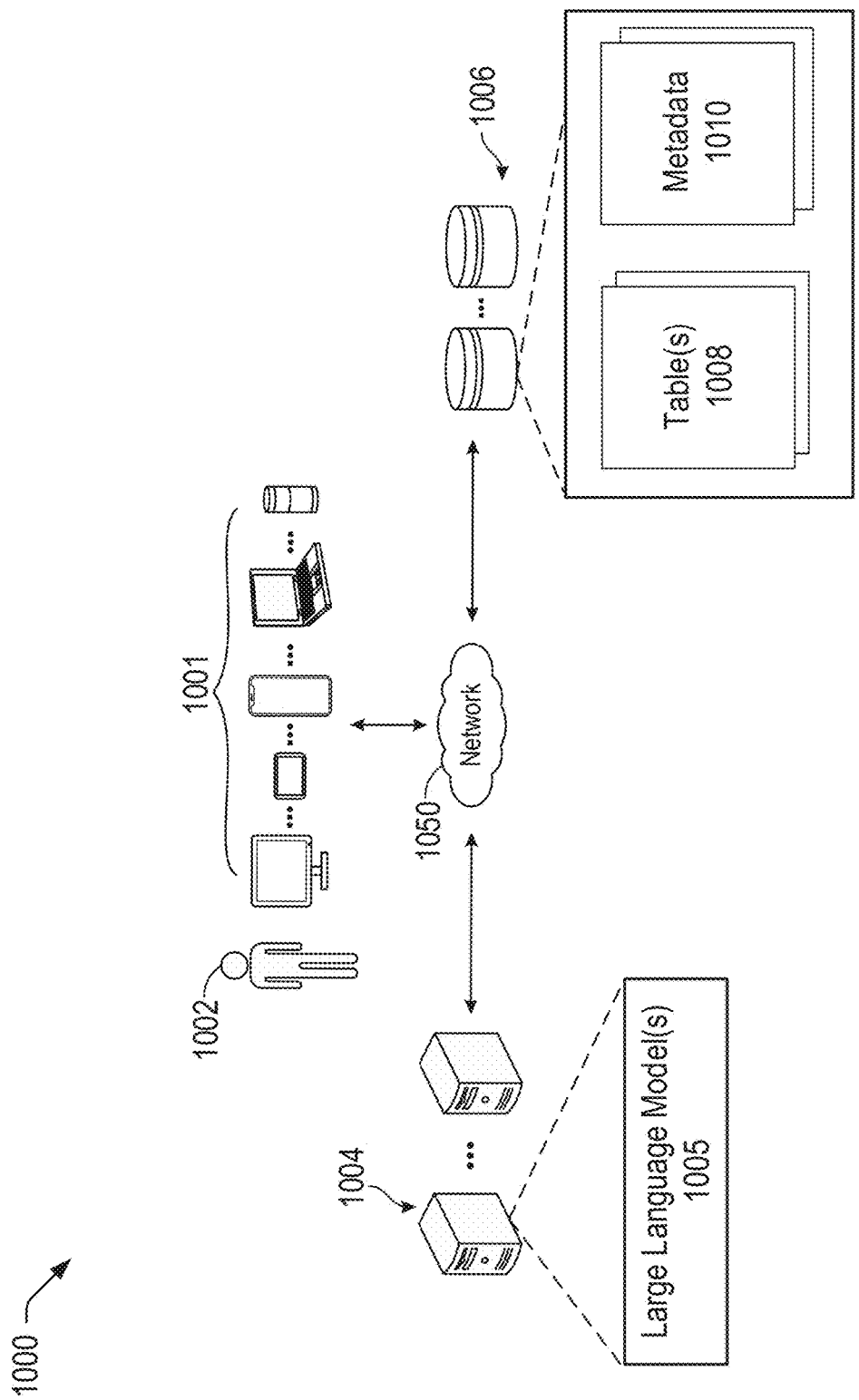
FIG. 10 depicts an example system for automated analysis of one or more tables in accordance with one or more example embodiments of the disclosure.

FIG. 10 is an example system 1000 for automated analysis of one or more tables. In one or more embodiments, the system may include one or more user devices 1001 (which may be associated with one or more users 1002), one or more computing devices 1004, and/or one or more databases 1006. However, these components of the system 1000 are merely exemplary and are not intended to be limiting in any way. For simplicity, reference may be made hereinafter to a user device 1001, computing device 1004, database 1006, etc., however, this is not intended to be limiting and may still refer to any number of such elements.

The user device 1001 may be any type of device, such as a smartphone, desktop computer, laptop computer, tablet, smart television (for example, a television with Internet connectivity, the capability to install applications, etc.), and/or any other type of device. The user device 1001 may also the user 1002 to view information about any tables 1008. The user device 1001 may also allow the user 1002 to interact with the large language model 1005, such as providing a prompt for the large language model 1005 to summarize the contents of a table 1008 or produce any other outputs. The user device 1001 may also allow the user 1002 to view the outputs of the large language model 1005. For example, a table description for the table 1008 that is produced by the large language model 1005 may be viewable by the user 1002 via the user device 1001. The user device 1001 may also allow the user 1002 to perform any other different types of actions associated with the various use cases of the large language model 1005 as described herein or otherwise. For example, the user 1002 may interact with a chat bot that leveraged the large language model 1050 using the user device 1001. As another example, the user 1002 may submit a search query via the user device 1001 and the large language model 1005 may produce one or more search results to the search query based on information included in the table 1008.

The computing device 1004 may be any type of device (such as a local or remote server for example) used to perform any of the processing described herein. For example, the computing device 1004 may host the large language model 1005 that is trained to analyze any table(s) to produce various different types of outputs as described herein or otherwise. Once technical improvement of the large language model 1005 over existing systems is that the large language model 1005 may produce such outputs without requiring all of the contents to be provided as inputs. For example, the large language model 1005 may produce such outputs while only receiving minimal information, such as a table name and table column names. The large language model 1005 may perform the analysis without requiring the table contents to be provided (for example, the cell values within the table 1008, also generally referred to as "data entries" herein).

The database 1006 may store any of the data that is used as described herein. For example, the database 1006 may store any of the tables 1008 that are accessed and analyzed by the large language model 1005. The database 1006 may also store any metadata 1010 that is associated with any of the tables. The metadata 1006 may include any additional information about the tables 1008, such as an indication of the creator of the data, a source of the data, etc.

In one or more embodiments, any of the elements of the system 1000 (for example, one or more user devices 1001, one or more computing devices 1004, one or more databases 1006, and/or any other element described with respect to FIG. 10 or otherwise) may be configured to communicate via a communications network 1050. The communications network 1050 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 1050 may have any suitable communication range associated therewith and may include, for example, global networks (e.g., the Internet), metropolitan area networks (MANs), wide area networks (WANs), local area networks (LANs), or personal area networks (PANs). In addition, communications network 450 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, one or more user devices 1001, one or more computing devices 1004, and/or one or more databases 1006) of the system 1000 may include any of the elements of the computing device 1100 as well (such as the processor 1102, memory 1104, etc.).

Figure 11:
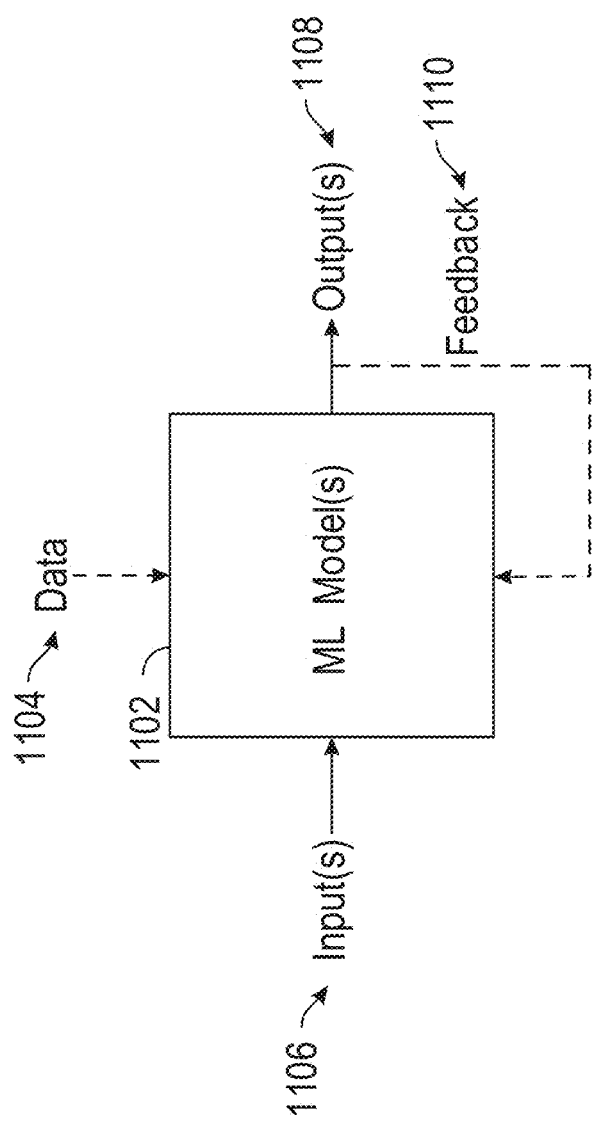
FIG. 11 depicts an example machine learning process for automated analysis of one or more tables in accordance with one or more embodiments of the present disclosure.

FIG. 11 depicts an example machine learning process for automated analysis of one or more tables. Particularly, FIG. 11 illustrates an example training methodology for a machine learning model 1102, such as the large language model as described herein. FIG. 11 shows that the machine learning model 1102 receives one or more inputs 1106, which may include any of the inputs described herein. The machine learning model 1102 may produce one or more outputs 1108 based on the one or more inputs 1106. Based on the one or more outputs 1108, a feedback loop 1110 may be used to train the machine learning model 1102 to more effectively perform the task of analyzing tables and producing information about the tables. For example, in supervised training, the outputs 1108 of the machine learning model 1102 may be compared to a known ground truth to train the machine learning model 1102. However, the training may also be performed in any other suitable manner described herein or otherwise.

Figure 12:
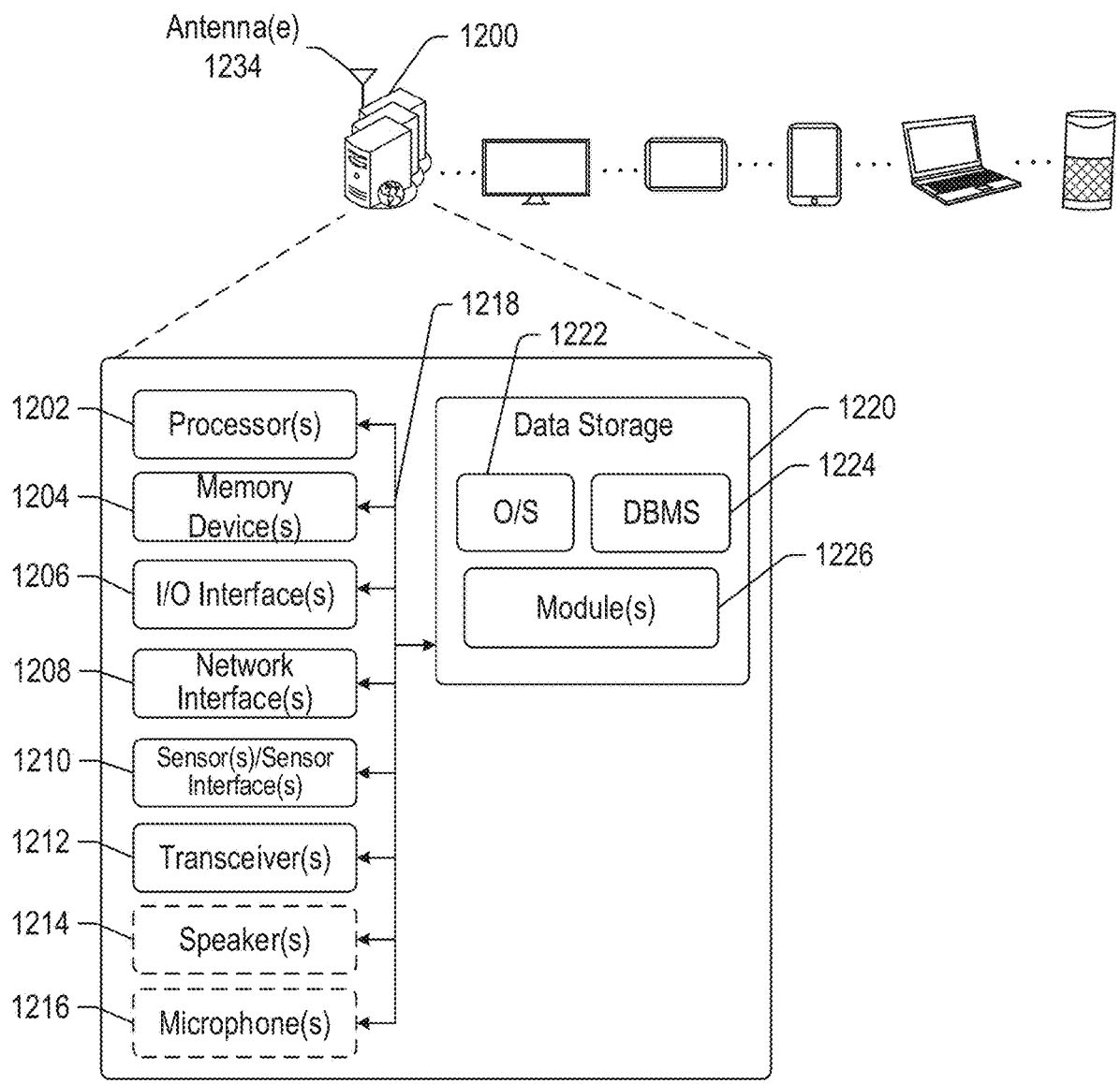
FIG. 12 depicts an example computing device in accordance with one or more example embodiments of the disclosure.

FIG. 12 is a schematic block diagram of an illustrative computing device 1200 in accordance with one or more example embodiments of the disclosure. The computing device 1200 may include any suitable computing device capable of receiving and/or generating data including, but not limited to, a user device such as a smartphone, tablet, e-reader, wearable device, or the like; a desktop computer; a laptop computer; a content streaming device; a set-top box; or the like. The computing device 1200 may correspond to an illustrative device configuration for the devices of FIGS. 1-11 (such as the user device 401 and computing device 404, for example).

The computing device 1200 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1200 may include one or more processors (processor(s)) 1202, one or more memory devices 1204 (generically referred to herein as memory 1204), one or more input/output (I/O) interface(s) 1206, one or more network interface(s) 1208, one or more sensors or sensor interface(s) 1210, one or more transceivers 1212, one or more optional speakers 1214, one or more optional microphones 1216, and data storage 1220. The computing device 1200 may further include one or more buses 1218 that functionally couple various components of the computing device 1200. The computing device 1200 may further include one or more antenna (e) 1234 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1218 may include at least one of a system bus, a memory bus, an address bus, or a message bus, and may permit exchange of information (e.g., data (including computer-executable code), signaling, etc.) between various components of the computing device 1200. The bus(es) 1218 may include, without limitation, a memory bus or a memory controller, a peripheral bus, an accelerated graphics port, and so forth. The bus(es) 1218 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1204 of the computing device 1200 may include volatile memory (memory that maintains its state when supplied with power) such as random-access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than nonvolatile memory. However, in certain other example embodiments, certain types of nonvolatile memory (e.g., FRAM) may enable faster read/write access than certain types of volatile memory.

In various implementations, the memory 1204 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 1204 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 1220 may include removable storage and/or nonremovable storage including, but not limited to, magnetic storage, optical disk storage, and/or tape storage. The data storage 1220 may provide nonvolatile storage of computer-executable instructions and other data. The memory 1204 and the data storage 1220, removable and/or nonremovable, are examples of computer-readable storage media (CRSM) as that term is used herein.

The data storage 1220 may store computer-executable code, instructions, or the like that may be loadable into the memory 1204 and executable by the processor(s) 1202 to cause the processor(s) 1202 to perform or initiate various operations. The data storage 1220 may additionally store data that may be copied to memory 1204 for use by the processor(s) 1202 during the execution of the computer-executable instructions. Moreover, output data generated as a result of execution of the computer-executable instructions by the processor(s) 1202 may be stored initially in memory 1204, and may ultimately be copied to data storage 1220 for nonvolatile storage.

More specifically, the data storage 1220 may store one or more operating systems (O/S) 1222; one or more database management systems (DBMS) 1224; and one or more program module(s), applications, engines, computer-executable code, scripts, or the like such as, for example, one or more module(s) 1226. Any of the components depicted as being stored in data storage 1220 may include any combination of software, firmware, and/or hardware. The software and/or firmware may include computer-executable code, instructions, or the like that may be loaded into the memory 1204 for execution by one or more of the processor(s) 1202. Any of the components depicted as being stored in data storage 1220 may support functionality described in reference to correspondingly named components earlier in this disclosure.

The data storage 1220 may further store various types of data utilized by components of the computing device 1200. Any data stored in the data storage 1220 may be loaded into the memory 1204 for use by the processor(s) 1202 in executing computer-executable code. In addition, any data depicted as being stored in the data storage 1220 may potentially be stored in one or more datastore(s) and may be accessed via the DBMS 1224 and loaded in the memory 1204 for use by the processor(s) 1202 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 12, the datastore(s) may include, for example, purchase history information, user action information, user profile information, a database linking search queries and user actions, and other information.

The processor(s) 1202 may be configured to access the memory 1204 and execute computer-executable instructions loaded therein. For example, the processor(s) 1202 may be configured to execute computer-executable instructions of the various program module(s), applications, engines, or the like of the computing device 1200 to cause or facilitate various operations to be performed in accordance with one or more embodiments of the disclosure. The processor(s) 1202 may include any suitable processing unit capable of accepting data as input, processing the input data in accordance with stored computer-executable instructions, and generating output data. The processor(s) 1202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1202 may be capable of supporting any of a variety of instruction sets.

Referring now to functionality supported by the various program module(s) depicted in FIG. 12, the module(s) 1226 may include computer-executable instructions, code, or the like that responsive to execution by one or more of the processor(s) 1202 may perform functions including, but not limited to, analysis of one or more tables to produce output information such as table descriptions, column descriptions, use cases for the data in the table, etc.

Referring now to other illustrative components depicted as being stored in the data storage 1220, the O/S 1222 may be loaded from the data storage 1220 into the memory 1204 and may provide an interface between other application software executing on the computing device 1200 and hardware resources of the computing device 1200. More specifically, the O/S 1222 may include a set of computer-executable instructions for managing hardware resources of the computing device 1200 and for providing common services to other application programs (e.g., managing memory allocation among various application programs). In certain example embodiments, the O/S 1222 may control execution of the other program module(s) to dynamically enhance characters for content rendering. The O/S 1222 may include any operating system now known or which may be developed in the future including, but not limited to, any server operating system, any mainframe operating system, or any other proprietary or non-proprietary operating system.

The DBMS 1224 may be loaded into the memory 1204 and may support functionality for accessing, retrieving, storing, and/or manipulating data stored in the memory 1204 and/or data stored in the data storage 1220. The DBMS 1224 may use any of a variety of database models (e.g., relational model, object model, etc.) and may support any of a variety of query languages. The DBMS 1224 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 1200 is a user device, the DBMS 1224 may be any suitable light-weight DBMS optimized for performance on a user device.

Referring now to other illustrative components of the computing device 1200, the input/output (I/O) interface(s) 1206 may facilitate the receipt of input information by the computing device 1200 from one or more I/O devices as well as the output of information from the computing device 1200 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1200 or may be separate. The I/O devices may further include, for example, any number of peripheral devices such as data storage devices, printing devices, and so forth.

The I/O interface(s) 1206 may also include an interface for an external peripheral device connection such as universal serial bus (USB), FireWire, Thunderbolt, Ethernet port or other connection protocol that may connect to one or more networks. The I/O interface(s) 1206 may also include a connection to one or more of the antenna (e) 1234 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 1200 may further include one or more network interface(s) 1208 via which the computing device 1200 may communicate with any of a variety of other systems, platforms, networks, devices, and so forth. The network interface(s) 1208 may enable communication, for example, with one or more wireless routers, one or more host servers, one or more web servers, and the like via one or more of networks.

The antenna (e) 1234 may include any suitable type of antenna depending, for example, on the communications protocols used to transmit or receive signals via the antenna (e) 1234. Non-limiting examples of suitable antennas may include directional antennas, nondirectional antennas, dipole antennas, folded dipole antennas, patch antennas, multiple-input multiple-output (MIMO) antennas, or the like. The antenna (e) 1234 may be communicatively coupled to one or more transceivers 1212 or radio components to which or from which signals may be transmitted or received.

As previously described, the antenna (e) 1234 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 1234 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) 1234 may be configured to transmit or receive radio frequency signals within any suitable frequency range forming part of the unlicensed portion of the radio spectrum.

The antenna (e) 1234 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1212 may include any suitable radio component(s) for—in cooperation with the antenna (e) 1234—transmitting or receiving radio frequency (RF) signals in the bandwidth and/or channels corresponding to the communications protocols utilized by the computing device 1200 to communicate with other devices. The transceiver(s) 1212 may include hardware, software, and/or firmware for modulating, transmitting, or receiving-potentially in cooperation with any of antenna (e) 1234—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards.

The transceiver(s) 1212 may further include hardware, firmware, or software for receiving GNSS signals. The transceiver(s) 1212 may include any known receiver and baseband suitable for communicating via the communications protocols utilized by the computing device 1200. The transceiver(s) 1212 may further include a low noise amplifier (LNA), additional signal amplifiers, an analog-to-digital (A/D) converter, one or more buffers, a digital baseband, or the like.

The sensor(s)/sensor interface(s) 1210 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1214 may be any device configured to generate audible sound. The optional microphone(s) 1216 may be any device configured to receive analog sound input or voice data.

It should be appreciated that the program module(s), applications, computer-executable instructions, code, or the like depicted in FIG. 12 as being stored in the data storage 1220 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1200, and/or hosted on other computing device(s) accessible via one or more networks, may be provided to support functionality provided by the program module(s), applications, or computer-executable code depicted in FIG. 12 and/or additional or alternate functionality. Further, functionality may be modularized differently such that processing described as being supported collectively by the collection of program module(s) depicted in FIG. 12 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 12 may be implemented, at least partially, in hardware and/or firmware across any number of devices.

It should further be appreciated that the computing device 1200 may include alternate and/or additional hardware, software, or firmware components beyond those described or depicted without departing from the scope of the disclosure. More particularly, it should be appreciated that software, firmware, or hardware components depicted as forming part of the computing device 1200 are merely illustrative and that some components may not be present or additional components may be provided in various embodiments. While various illustrative program module(s) have been depicted and described as software module(s) stored in data storage 1220, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   receiving, by a large language model, first information associated with a first table, the first information including at least one of: a table name, a column name, and a data type;
   producing, by the large language model, based on the first information, and without receiving an indication of data entries within the first table, one or more first outputs, the one or more first outputs including at least one of: providing a first indication of data entries included within the first table, a table description, an attribute description, and a use case for data included within the first table;
   producing, by the large language model, one or more second outputs providing a second indication of content included within the first table;
   comparing, using a classifier, the one or more first outputs and the one or more second outputs; and
   determining a difference between the one or more first outputs and the one or more second outputs based on the comparison;
   determining, based on the difference, a probability that the first output is a hallucination produced by the large language model;
   determining one or more metrics associated with the first output; and
   determining, by the large language model and based on the one or more metrics, a first score;
   determining, by the large language model and based on the first score and the probability, a second score associated with the indication of the content, the second score being a confidence score providing an indication of an accuracy of the first output; and
   outputting, by the large language model, the confidence score.

2. The method of claim 1, further comprising:
   providing a first prompt to the large language model, wherein the one or more first outputs are produced based on the first prompt; and
   providing a second prompt and the one or more first outputs to the large language model, wherein the one or more second outputs is produced by the large language model based on the first prompt and the one or more first outputs.

3. The method of claim 1, further comprising:
   receiving, by the large language model, second information associated with a second table; and
   determining, by the large language model and based on the first information and second information, a relationship between the first table and the second table.

4. The method of claim 1, further comprising:
   receiving metadata associated with the first table.

5. A method comprising:
   receiving, by a large language model, first information associated with a first table;
   producing, by the large language model, based on the first information, and without receiving at least some data entries within the first table, a first output providing a first indication of content included within the first table;
   determining, by the large language model, a first score associated with the first indication of the content, the first score being a confidence score providing an indication of an accuracy of the first output; and
   outputting, by the large language model, the first score.

6. The method of claim 5, wherein the first information includes at least one of: a table name, a column name, and a data type.

7. The method of claim 6, wherein the first indication of content included within the first table includes at least one of: a table description, an attribute description, and a use case for data included within the first table.

8. The method of claim 6, wherein determining the confidence score further comprises:
producing, by the large language model, a second output providing a second indication of content included within the first table;
comparing, using a classifier, the first output and the second output;
determining a difference between the first output and the second output based on the comparison; and
determining, based on the difference, a probability that the first output is a hallucination produced by the large language model.

9. The method of claim 8, further comprising:
determining one or more metrics associated with the first output; and
determining, by the large language model and based on the one or more metrics, a second score, wherein the first score is based on a combination of the probability and the second score.

10. The method of claim 9, further comprising:
filtering the first output based on at least one of the probability and the second score.

11. The method of claim 6, further comprising:
receiving, by the large language model, a first prompt, wherein the first output is produced based on the first prompt; and
receiving, by the large language model, a second prompt and the first output, wherein a second output is produced by the large language model based on the second prompt and the first output.

12. The method of claim 6, further comprising:
receiving, by the large language model, second information associated with a second table; and
determining, by the large language model and based on the first information and second information, a relationship between the first table and the second table.

13. A system comprising:
memory that stores computer-executable instructions; and
one or more processors configured to access the memory and execute the computer-executable instructions to:
receive, by a large language model, first information associated with a first table;
produce, by the large language model, based on the first information, and without receiving at least some data entries within the first table, a first output providing a first indication of content included within the first table;
determine, by the large language model, a first score associated with the first indication of the content, the first score being a confidence score providing an indication of an accuracy of the first output; and
output, by the large language model, the first score.

14. The system of claim 13, wherein the first information includes at least one of: a table name, a column name, and a data type.

15. The system of claim 13, wherein the first indication of content included within the first table includes at least one of: a table description, an attribute description, and a use case for data included within the first table.

16. The system of claim 13, where determine the confidence score further comprises:
produce, by the large language model, a second output providing a second indication of content included within the first table;
compare, using a classifier, the first output and the second output; and
determine a difference between the first output and the second output based on the comparison; and
determine, based on the difference, a probability that the first output is a hallucination produced by the large language model.

17. The system of claim 16, wherein the one or more processors are further configured to execute the computer-executable instructions to:
determine one or more metrics associated with the first output; and
determine, by the large language model and based on the one or more metrics, a second score, wherein the first score is based on a combination of the probability and the second score.

18. The system of claim 17, wherein the one or more processors configured to access the memory and execute the computer-executable instructions to:
filter the first output based on at least one of the probability and the second score.

19. The system of claim 13, wherein the one or more processors configured to access the memory and execute the computer-executable instructions to:
receive, by the large language model, a first prompt, wherein the first output is produced based on the first prompt; and
receive, by the large language model, a second prompt and the first output, wherein a second output is produced by the large language model based on the second prompt and the first output.

20. The system of claim 13, wherein the one or more processors configured to access the memory and execute the computer-executable instructions to:
receive, by the large language model, second information associated with a second table; and
determine, by the large language model and based on the first information and second information, a relationship between the first table and the second table.

* * * * *